(12) United States Patent
Zou et al.

(10) Patent No.: US 11,397,653 B2
(45) Date of Patent: Jul. 26, 2022

(54) TECHNOLOGIES FOR FAST RECOVERY OF DISTRIBUTED STORAGE SYSTEMS ON DISAGGREGATED STORAGE

(71) Applicant: Intel Corporation, Santa Clara, CA (US)

(72) Inventors: Yi Zou, Portland, OR (US); Arun Raghunath, Portland, OR (US); Tushar Gohad, Phoenix, AZ (US); Anjaneya Reddy Chagam Reddy, Chandler, AZ (US); Sujoy Sen, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 554 days.

(21) Appl. No.: 16/424,594

(22) Filed: May 29, 2019

(65) Prior Publication Data

US 2019/0278676 A1    Sep. 12, 2019

(51) Int. Cl.
| | | |
|---|---|---|
| *G06F 11/00* | (2006.01) | |
| *G06F 11/20* | (2006.01) | |
| *G06F 13/40* | (2006.01) | |
| *G06F 13/16* | (2006.01) | |
| *G06F 11/07* | (2006.01) | |

(52) U.S. Cl.
CPC ...... *G06F 11/2094* (2013.01); *G06F 11/0709* (2013.01); *G06F 11/0727* (2013.01); *G06F 11/0751* (2013.01); *G06F 11/2092* (2013.01); *G06F 13/1668* (2013.01); *G06F 13/4027* (2013.01); *G06F 2201/805* (2013.01)

(58) Field of Classification Search
CPC ............. G06F 11/0709; G06F 11/0727; G06F 11/0751; G06F 11/2092; G06F 11/2094; H04L 41/0668; H04L 41/0659; H04L 41/0672
See application file for complete search history.

(56) References Cited

U.S. PATENT DOCUMENTS

| | | |
|---|---|---|
| 7,747,749 B1 | 6/2010 | Erikson et al. |
| 9,996,539 B1 | 6/2018 | Natanzon |
| 10,078,468 B2 | 9/2018 | Ober et al. |
| 10,454,754 B1 * | 10/2019 | Patel ........................ H04L 69/40 |

(Continued)

OTHER PUBLICATIONS

Reddit, "OVH is Down in Europe", Nov. 8, 2017, accessed Oct. 18, 2018, https://www.reddit.com/r/sysadmin/comments/7bs1zk/ovh_is_down_in_europe/.

*Primary Examiner* — Michael Maskulinski
(74) *Attorney, Agent, or Firm* — Compass IP Law, PC

(57) ABSTRACT

Technologies for fast distributed storage recovery include a distributed storage system that includes multiple controller nodes and multiple target nodes. Each controller node is coupled to a corresponding target node via a storage fabric. Each target node stores replica data. The system identifies a failed node and a corresponding node that was coupled to the failed node. If the failed node is a controller node, the corresponding node is a target node. If the failed node is a target node, the corresponding node is a controller node. The system instantiates a replacement node, adds the replacement node to the system, and couples the replacement node to the corresponding node. The system may direct a backup target node to copy replica data to the replacement target node via the storage fabric. Other embodiments are described and claimed.

25 Claims, 19 Drawing Sheets

(56) References Cited

U.S. PATENT DOCUMENTS

| | | |
|---|---|---|
| 2011/0029744 A1 | 2/2011 | Leggette et al. |
| 2011/0055156 A1* | 3/2011 | Roberts .............. G06F 11/2094 707/626 |
| 2013/0086006 A1 | 4/2013 | Colgrove et al. |
| 2014/0325256 A1* | 10/2014 | Lambert ............. G06F 11/2094 714/4.11 |
| 2015/0293984 A1 | 10/2015 | Zolotusky et al. |
| 2017/0060442 A1 | 3/2017 | Dunn |
| 2018/0024964 A1 | 1/2018 | Mao et al. |
| 2018/0181330 A1* | 6/2018 | Kusters .................. G06F 3/065 |
| 2018/0260125 A1 | 9/2018 | Botes et al. |
| 2019/0042090 A1 | 2/2019 | Raghunath et al. |
| 2019/0042091 A1 | 2/2019 | Raghunath et al. |

* cited by examiner

TECHNOLOGIES FOR FAST RECOVERY OF DISTRIBUTED STORAGE SYSTEMS ON DISAGGREGATED STORAGE

BACKGROUND

Large data centers may provide scale-out distributed software defined storage (SDS) solutions. High availability and data durability are typical customer requirements for scale-out SDS solutions. High availability and data durability may be achieved via data redundancy or erasure coding across a networks, for example using Ceph, OpenStack® Swift, or Apache® HDFS. Such systems may be failure-tolerant but may enter a degraded mode in response to a failure, for example by operating with fewer redundant replicas of data. Recovery of the distributed storage system to its original state may be a highly manual, time-consuming process.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION

Figure 1:
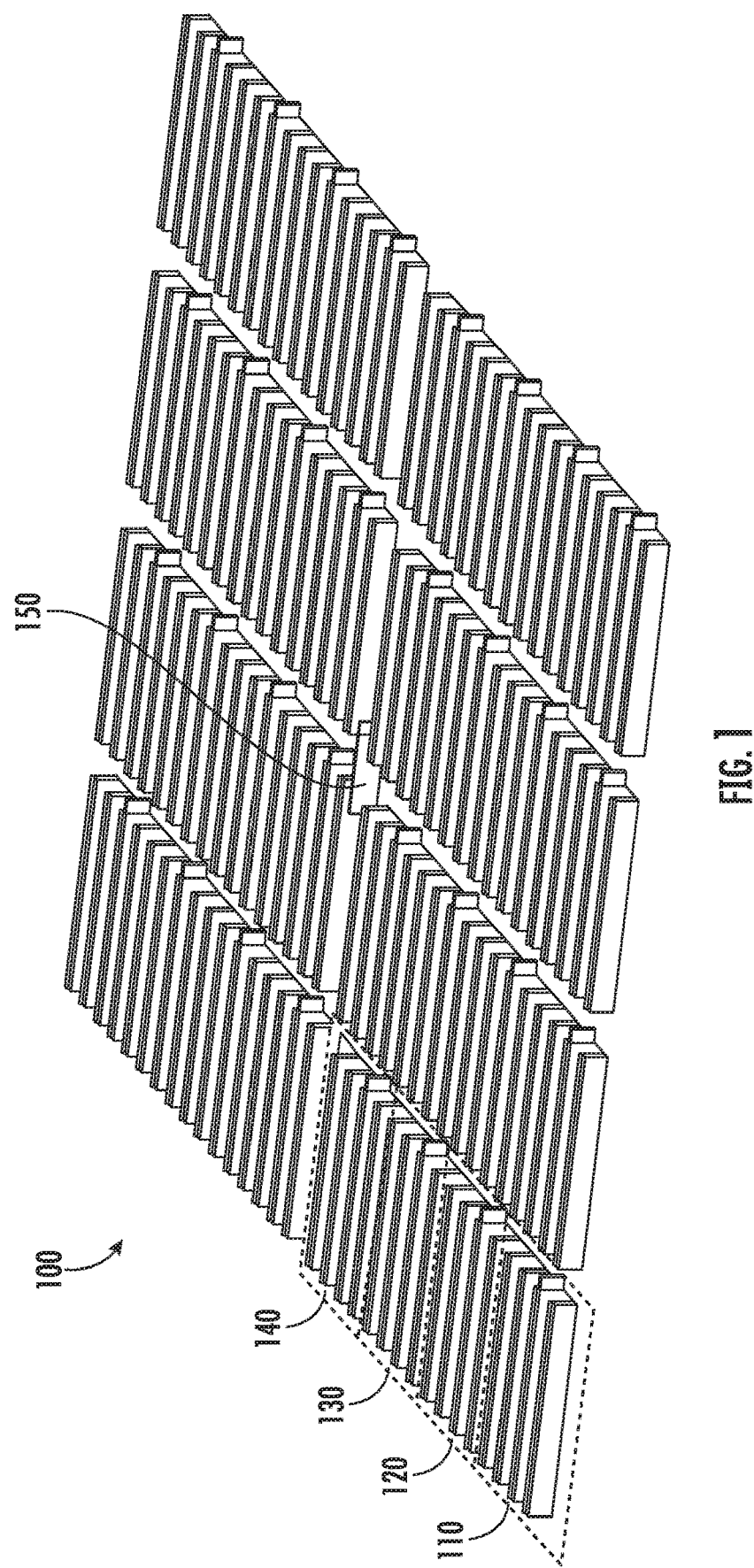
FIG. 1 is a simplified diagram of at least one embodiment of a data center for executing workloads with disaggregated resources.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or nonvolatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a data center 100 in which disaggregated resources may cooperatively execute one or more workloads (e.g., applications on behalf of customers) includes multiple pods 110, 120, 130, 140, each of which includes one or more rows of racks. Of course, although data center 100 is shown with multiple pods, in some embodiments, the data center 100 may be embodied as a single pod. As described in more detail herein, each rack houses multiple sleds, each of which may be primarily equipped with a particular type of resource (e.g., memory devices, data storage devices, accelerator devices, general purpose processors), i.e., resources that can be logically coupled to form a composed node, which can act as, for example, a server. In the illustrative embodiment, the sleds in each pod 110, 120, 130, 140 are connected to multiple pod switches (e.g., switches that route data communications to and from sleds within the pod). The pod switches, in turn, connect with spine switches 150 that switch communications among pods (e.g., the pods 110, 120, 130, 140) in the data center 100. In some embodiments, the sleds may be connected with a fabric using Intel Omni-Path technology. In other embodiments, the sleds may be connected with other fabrics, such as InfiniBand or Ethernet. As described in more detail herein, resources within sleds in the data center 100 may be allocated to a group (referred to herein as a "managed node") containing resources from one or more sleds to be collectively utilized in the execution of a workload. The workload can execute as if the resources belonging to the managed node were located on the same sled. The resources in a managed node may belong to sleds belonging to different racks, and even to different pods 110, 120, 130, 140. As such, some resources of a single sled may be allocated to one managed node while other resources of the same sled are allocated to a different managed node (e.g., one processor assigned to one managed node and another processor of the same sled assigned to a different managed node).

A data center comprising disaggregated resources, such as data center 100, can be used in a wide variety of contexts, such as enterprise, government, cloud service provider, and communications service provider (e.g., Telco's), as well as in a wide variety of sizes, from cloud service provider megadata centers that consume over 100,000 sq. ft. to single- or multi-rack installations for use in base stations.

The disaggregation of resources to sleds comprised predominantly of a single type of resource (e.g., compute sleds comprising primarily compute resources, memory sleds containing primarily memory resources), and the selective allocation and deallocation of the disaggregated resources to form a managed node assigned to execute a workload improves the operation and resource usage of the data center 100 relative to typical data centers comprised of hyperconverged servers containing compute, memory, storage and perhaps additional resources in a single chassis. For example, because sleds predominantly contain resources of a particular type, resources of a given type can be upgraded independently of other resources. Additionally, because different resources types (processors, storage, accelerators, etc.) typically have different refresh rates, greater resource utilization and reduced total cost of ownership may be achieved. For example, a data center operator can upgrade the processors throughout their facility by only swapping out the compute sleds. In such a case, accelerator and storage resources may not be contemporaneously upgraded and, rather, may be allowed to continue operating until those resources are scheduled for their own refresh. Resource utilization may also increase. For example, if managed nodes are composed based on requirements of the workloads that will be running on them, resources within a node are more likely to be fully utilized. Such utilization may allow for more managed nodes to run in a data center with a given set of resources, or for a data center expected to run a given set of workloads, to be built using fewer resources.

Figure 2:
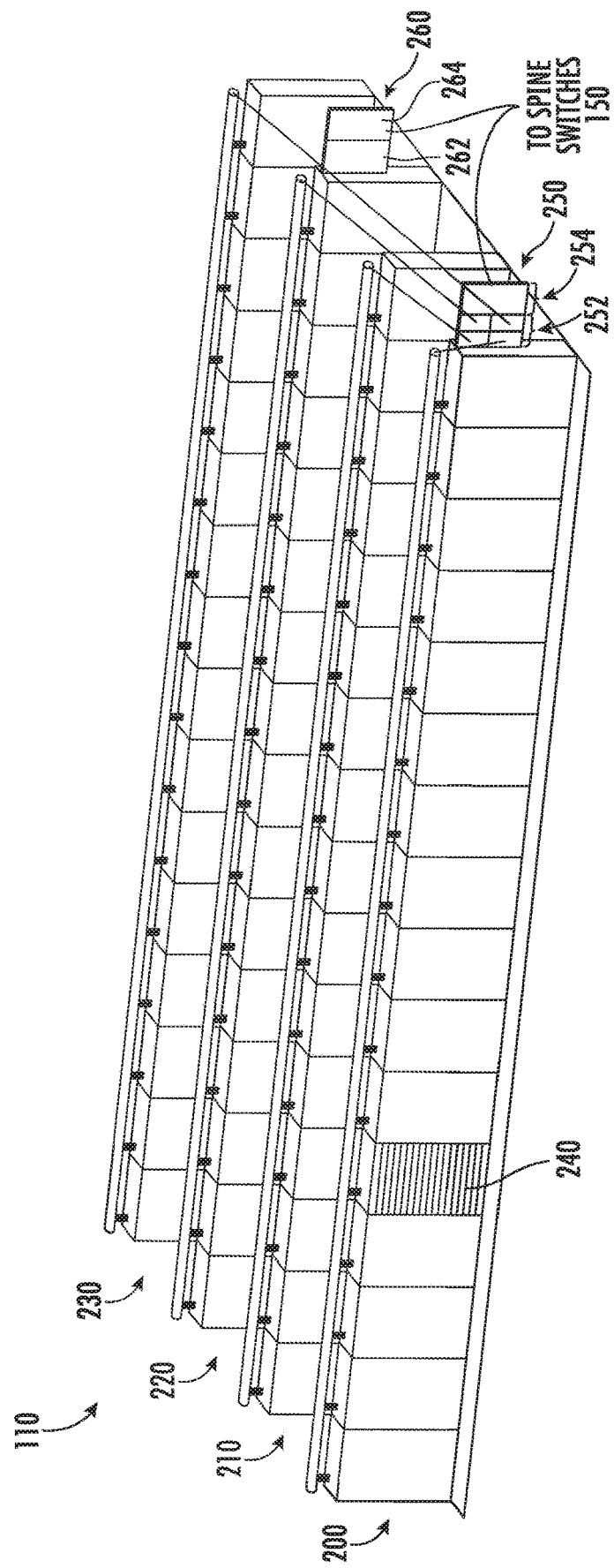
FIG. 2 is a simplified diagram of at least one embodiment of a pod that may be included in the data center of FIG. 1.

Referring now to FIG. 2, the pod 110, in the illustrative embodiment, includes a set of rows 200, 210, 220, 230 of racks 240. Each rack 240 may house multiple sleds (e.g., sixteen sleds) and provide power and data connections to the housed sleds, as described in more detail herein. In the illustrative embodiment, the racks in each row 200, 210, 220, 230 are connected to multiple pod switches 250, 260. The pod switch 250 includes a set of ports 252 to which the sleds of the racks of the pod 110 are connected and another set of ports 254 that connect the pod 110 to the spine switches 150 to provide connectivity to other pods in the data center 100. Similarly, the pod switch 260 includes a set of ports 262 to which the sleds of the racks of the pod 110 are connected and a set of ports 264 that connect the pod 110 to the spine switches 150. As such, the use of the pair of switches 250, 260 provides an amount of redundancy to the pod 110. For example, if either of the switches 250, 260 fails, the sleds in the pod 110 may still maintain data communication with the remainder of the data center 100 (e.g., sleds of other pods) through the other switch 250, 260. Furthermore, in the illustrative embodiment, the switches 150, 250, 260 may be embodied as dual-mode optical switches, capable of routing both Ethernet protocol communications carrying Internet Protocol (IP) packets and communications according to a second, high-performance link-layer protocol (e.g., Intel's Omni-Path Architecture's, InfiniBand, PCI Express) via optical signaling media of an optical fabric.

It should be appreciated that each of the other pods 120, 130, 140 (as well as any additional pods of the data center 100) may be similarly structured as, and have components similar to, the pod 110 shown in and described in regard to FIG. 2 (e.g., each pod may have rows of racks housing multiple sleds as described above). Additionally, while two pod switches 250, 260 are shown, it should be understood that in other embodiments, each pod 110, 120, 130, 140 may be connected to a different number of pod switches, providing even more failover capacity. Of course, in other embodiments, pods may be arranged differently than the rows-of-racks configuration shown in FIGS. 1-2. For example, a pod may be embodied as multiple sets of racks in which each set of racks is arranged radially, i.e., the racks are equidistant from a center switch.

Figure 3:
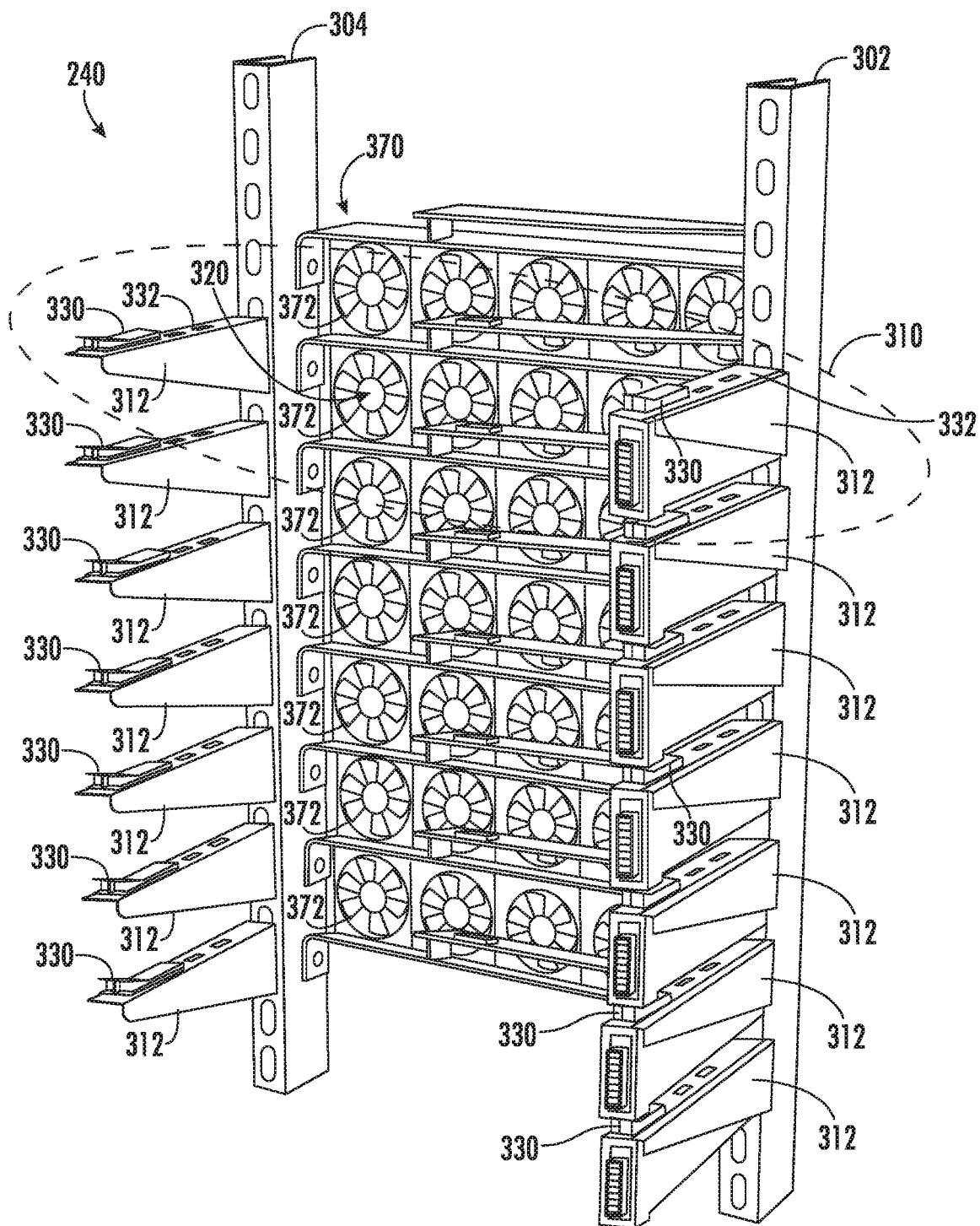
FIG. 3 is a perspective view of at least one embodiment of a rack that may be included in the pod of FIG. 2.
Figure 4:
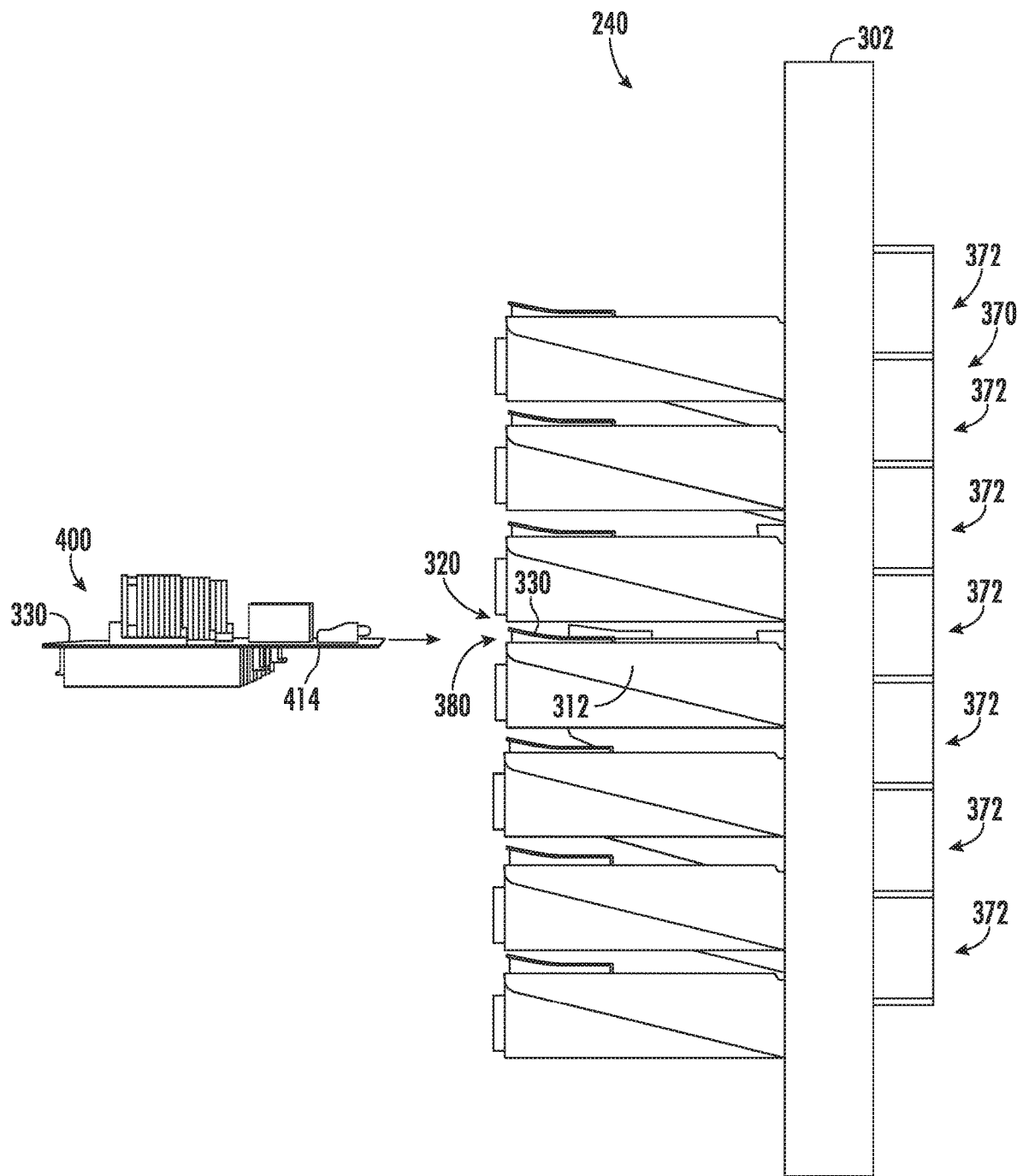
FIG. 4 is a side elevation view of the rack of FIG. 3.
Figure 5:
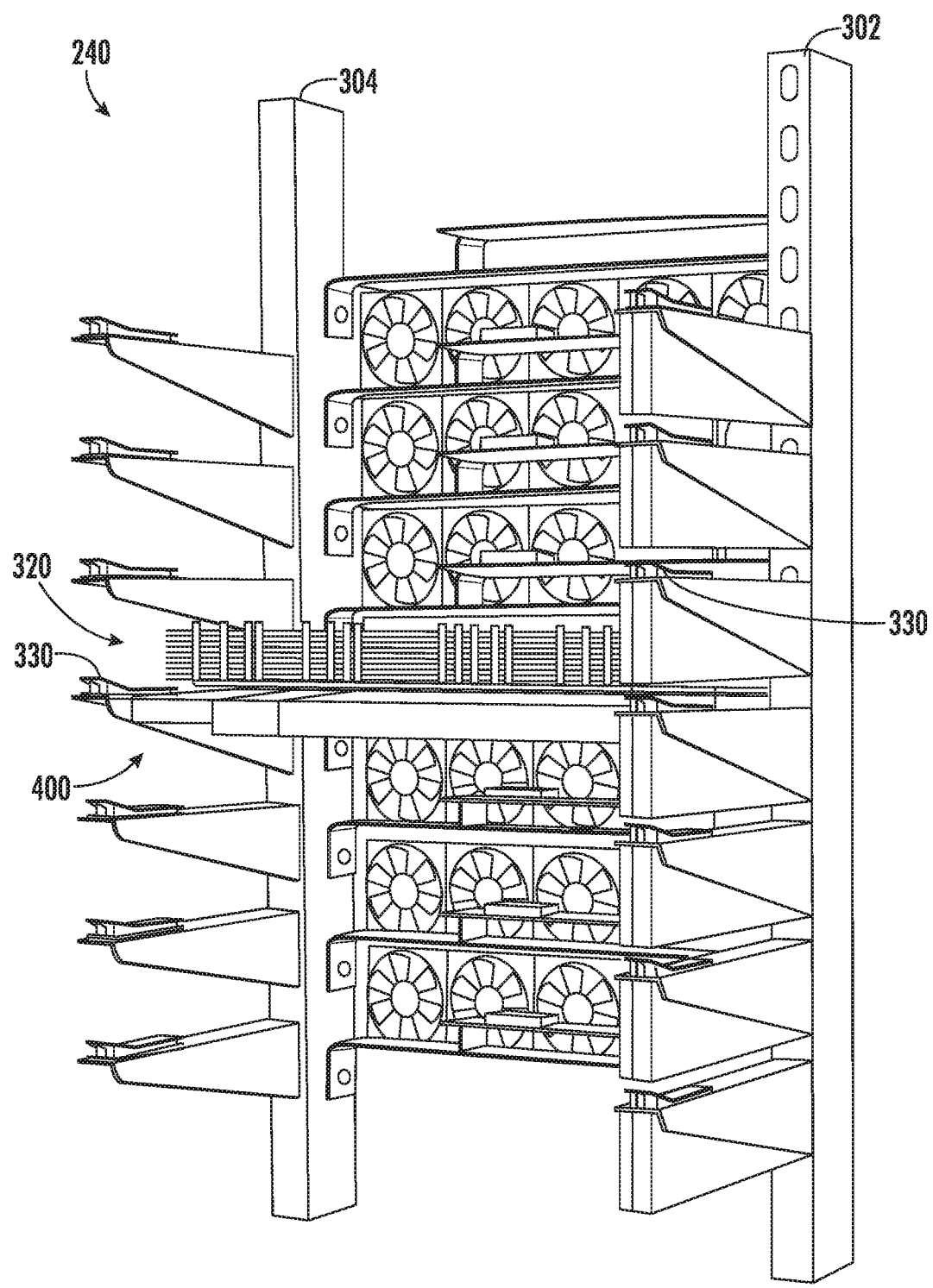
FIG. 5 is a perspective view of the rack of FIG. 3 having a sled mounted therein.

Referring now to FIGS. 3-5, each illustrative rack 240 of the data center 100 includes two elongated support posts 302, 304, which are arranged vertically. For example, the elongated support posts 302, 304 may extend upwardly from a floor of the data center 100 when deployed. The rack 240 also includes one or more horizontal pairs 310 of elongated support arms 312 (identified in FIG. 3 via a dashed ellipse) configured to support a sled of the data center 100 as discussed below. One elongated support arm 312 of the pair of elongated support arms 312 extends outwardly from the elongated support post 302 and the other elongated support arm 312 extends outwardly from the elongated support post 304.

In the illustrative embodiments, each sled of the data center 100 is embodied as a chassis-less sled. That is, each sled has a chassis-less circuit board substrate on which physical resources (e.g., processors, memory, accelerators, storage, etc.) are mounted as discussed in more detail below. As such, the rack 240 is configured to receive the chassis-less sleds. For example, each pair 310 of elongated support arms 312 defines a sled slot 320 of the rack 240, which is configured to receive a corresponding chassis-less sled. To do so, each illustrative elongated support arm 312 includes a circuit board guide 330 configured to receive the chassis-less circuit board substrate of the sled. Each circuit board guide 330 is secured to, or otherwise mounted to, a top side 332 of the corresponding elongated support arm 312. For example, in the illustrative embodiment, each circuit board guide 330 is mounted at a distal end of the corresponding elongated support arm 312 relative to the corresponding elongated support post 302, 304. For clarity of the Figures, not every circuit board guide 330 may be referenced in each Figure.

Each circuit board guide 330 includes an inner wall that defines a circuit board slot 380 configured to receive the chassis-less circuit board substrate of a sled 400 when the sled 400 is received in the corresponding sled slot 320 of the rack 240. To do so, as shown in FIG. 4, a user (or robot) aligns the chassis-less circuit board substrate of an illustrative chassis-less sled 400 to a sled slot 320. The user, or robot, may then slide the chassis-less circuit board substrate forward into the sled slot 320 such that each side edge 414 of the chassis-less circuit board substrate is received in a corresponding circuit board slot 380 of the circuit board guides 330 of the pair 310 of elongated support arms 312 that define the corresponding sled slot 320 as shown in FIG. 4. By having robotically accessible and robotically manipulable sleds comprising disaggregated resources, each type of resource can be upgraded independently of each other and at their own optimized refresh rate. Furthermore, the sleds are configured to blindly mate with power and data communication cables in each rack 240, enhancing their ability to be quickly removed, upgraded, reinstalled, and/or replaced. As such, in some embodiments, the data center 100 may operate (e.g., execute workloads, undergo maintenance and/or upgrades, etc.) without human involvement on the data center floor. In other embodiments, a human may facilitate one or more maintenance or upgrade operations in the data center 100.

It should be appreciated that each circuit board guide 330 is dual sided. That is, each circuit board guide 330 includes an inner wall that defines a circuit board slot 380 on each side of the circuit board guide 330. In this way, each circuit board guide 330 can support a chassis-less circuit board substrate on either side. As such, a single additional elongated support post may be added to the rack 240 to turn the rack 240 into a two-rack solution that can hold twice as many sled slots 320 as shown in FIG. 3. The illustrative rack 240 includes seven pairs 310 of elongated support arms 312 that define a corresponding seven sled slots 320, each configured to receive and support a corresponding sled 400 as discussed above. Of course, in other embodiments, the rack 240 may include additional or fewer pairs 310 of elongated support arms 312 (i.e., additional or fewer sled slots 320). It should be appreciated that because the sled 400 is chassis-less, the sled 400 may have an overall height that is different than typical servers. As such, in some embodiments, the height of each sled slot 320 may be shorter than the height of a typical server (e.g., shorter than a single rank unit, "1U"). That is, the vertical distance between each pair 310 of elongated support arms 312 may be less than a standard rack unit "1U." Additionally, due to the relative decrease in height of the sled slots 320, the overall height of the rack 240 in some embodiments may be shorter than the height of traditional rack enclosures. For example, in some embodiments, each of the elongated support posts 302, 304 may have a length of six feet or less. Again, in other embodiments, the rack 240 may have different dimensions. For example, in some embodiments, the vertical distance between each pair 310 of elongated support arms 312 may be greater than a standard rack until "1U". In such embodiments, the increased vertical distance between the sleds allows for larger heat sinks to be attached to the physical resources and for larger fans to be used (e.g., in the fan array 370 described below) for cooling each sled, which in turn can allow the physical resources to operate at increased power levels. Further, it should be appreciated that the rack 240 does not include any walls, enclosures, or the like. Rather, the rack 240 is an enclosure-less rack that is opened to the local environment. Of course, in some cases, an end plate may be attached to one of the elongated support posts 302, 304 in those situations in which the rack 240 forms an end-of-row rack in the data center 100.

In some embodiments, various interconnects may be routed upwardly or downwardly through the elongated support posts 302, 304. To facilitate such routing, each elongated support post 302, 304 includes an inner wall that defines an inner chamber in which interconnects may be located. The interconnects routed through the elongated support posts 302, 304 may be embodied as any type of interconnects including, but not limited to, data or communication interconnects to provide communication connections to each sled slot 320, power interconnects to provide power to each sled slot 320, and/or other types of interconnects.

The rack 240, in the illustrative embodiment, includes a support platform on which a corresponding optical data connector (not shown) is mounted. Each optical data connector is associated with a corresponding sled slot 320 and is configured to mate with an optical data connector of a corresponding sled 400 when the sled 400 is received in the corresponding sled slot 320. In some embodiments, optical connections between components (e.g., sleds, racks, and switches) in the data center 100 are made with a blind mate optical connection. For example, a door on each cable may prevent dust from contaminating the fiber inside the cable. In the process of connecting to a blind mate optical connector mechanism, the door is pushed open when the end of the cable approaches or enters the connector mechanism. Subsequently, the optical fiber inside the cable may enter a gel within the connector mechanism and the optical fiber of one cable comes into contact with the optical fiber of another cable within the gel inside the connector mechanism.

The illustrative rack 240 also includes a fan array 370 coupled to the cross-support arms of the rack 240. The fan array 370 includes one or more rows of cooling fans 372, which are aligned in a horizontal line between the elongated support posts 302, 304. In the illustrative embodiment, the fan array 370 includes a row of cooling fans 372 for each sled slot 320 of the rack 240. As discussed above, each sled 400 does not include any on-board cooling system in the illustrative embodiment and, as such, the fan array 370 provides cooling for each sled 400 received in the rack 240. Each rack 240, in the illustrative embodiment, also includes a power supply associated with each sled slot 320. Each power supply is secured to one of the elongated support arms 312 of the pair 310 of elongated support arms 312 that define the corresponding sled slot 320. For example, the rack 240 may include a power supply coupled or secured to each elongated support arm 312 extending from the elongated support post 302. Each power supply includes a power connector configured to mate with a power connector of the sled 400 when the sled 400 is received in the corresponding sled slot 320. In the illustrative embodiment, the sled 400 does not include any on-board power supply and, as such, the power supplies provided in the rack 240 supply power to corresponding sleds 400 when mounted to the rack 240. Each power supply is configured to satisfy the power requirements for its associated sled, which can vary from sled to sled. Additionally, the power supplies provided in the rack 240 can operate independent of each other. That is, within a single rack, a first power supply providing power to a compute sled can provide power levels that are different than power levels supplied by a second power supply providing power to an accelerator sled. The power supplies may be controllable at the sled level or rack level, and may be controlled locally by components on the associated sled or remotely, such as by another sled or an orchestrator.

Figure 6:
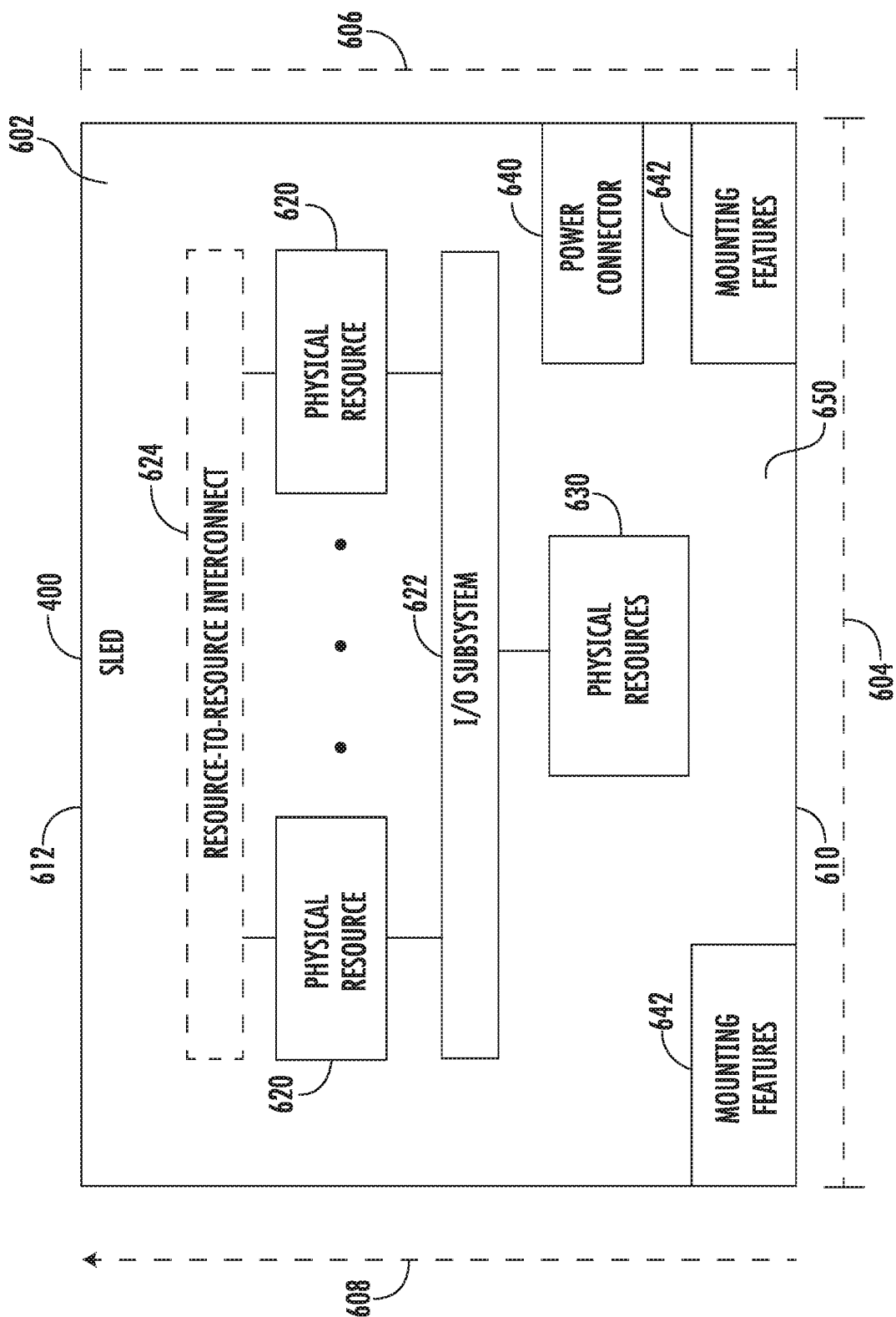
FIG. 6 is a is a simplified block diagram of at least one embodiment of a top side of the sled of FIG. 5.

Referring now to FIG. 6, the sled 400, in the illustrative embodiment, is configured to be mounted in a corresponding rack 240 of the data center 100 as discussed above. In some embodiments, each sled 400 may be optimized or otherwise configured for performing particular tasks, such as compute tasks, acceleration tasks, data storage tasks, etc. For example, the sled 400 may be embodied as a compute sled 800 as discussed below in regard to FIGS. 8-9, an accelerator sled 1000 as discussed below in regard to FIGS. 10-11, a storage sled 1200 as discussed below in regard to FIGS. 12-13, or as a sled optimized or otherwise configured to perform other specialized tasks, such as a memory sled 1400, discussed below in regard to FIG. 14.

As discussed above, the illustrative sled 400 includes a chassis-less circuit board substrate 602, which supports various physical resources (e.g., electrical components) mounted thereon. It should be appreciated that the circuit board substrate 602 is "chassis-less" in that the sled 400 does not include a housing or enclosure. Rather, the chassis-less circuit board substrate 602 is open to the local environment. The chassis-less circuit board substrate 602 may be formed from any material capable of supporting the various electrical components mounted thereon. For example, in an illustrative embodiment, the chassis-less circuit board substrate 602 is formed from an FR-4 glass-reinforced epoxy laminate material. Of course, other materials may be used to form the chassis-less circuit board substrate 602 in other embodiments.

As discussed in more detail below, the chassis-less circuit board substrate 602 includes multiple features that improve the thermal cooling characteristics of the various electrical components mounted on the chassis-less circuit board substrate 602. As discussed, the chassis-less circuit board substrate 602 does not include a housing or enclosure, which may improve the airflow over the electrical components of the sled 400 by reducing those structures that may inhibit air flow. For example, because the chassis-less circuit board substrate 602 is not positioned in an individual housing or enclosure, there is no vertically-arranged backplane (e.g., a backplate of the chassis) attached to the chassis-less circuit board substrate 602, which could inhibit air flow across the electrical components. Additionally, the chassis-less circuit board substrate 602 has a geometric shape configured to reduce the length of the airflow path across the electrical components mounted to the chassis-less circuit board substrate 602. For example, the illustrative chassis-less circuit board substrate 602 has a width 604 that is greater than a depth 606 of the chassis-less circuit board substrate 602. In one particular embodiment, for example, the chassis-less circuit board substrate 602 has a width of about 21 inches and a depth of about 9 inches, compared to a typical server that has a width of about 17 inches and a depth of about 39 inches. As such, an airflow path 608 that extends from a front edge 610 of the chassis-less circuit board substrate 602 toward a rear edge 612 has a shorter distance relative to typical servers, which may improve the thermal cooling characteristics of the sled 400. Furthermore, although not illustrated in FIG. 6, the various physical resources mounted to the chassis-less circuit board substrate 602 are mounted in corresponding locations such that no two substantively heat-producing electrical components shadow each other as discussed in more detail below. That is, no two electrical components, which produce appreciable heat during operation (i.e., greater than a nominal heat sufficient enough to adversely impact the cooling of another electrical component), are mounted to the chassis-less circuit board substrate 602 linearly in-line with each other along the direction of the airflow path 608 (i.e., along a direction extending from the front edge 610 toward the rear edge 612 of the chassis-less circuit board substrate 602).

As discussed above, the illustrative sled 400 includes one or more physical resources 620 mounted to a top side 650 of the chassis-less circuit board substrate 602. Although two physical resources 620 are shown in FIG. 6, it should be appreciated that the sled 400 may include one, two, or more physical resources 620 in other embodiments. The physical resources 620 may be embodied as any type of processor, controller, or other compute circuit capable of performing various tasks such as compute functions and/or controlling the functions of the sled 400 depending on, for example, the type or intended functionality of the sled 400. For example, as discussed in more detail below, the physical resources 620 may be embodied as high-performance processors in embodiments in which the sled 400 is embodied as a compute sled, as accelerator co-processors or circuits in embodiments in which the sled 400 is embodied as an accelerator sled, storage controllers in embodiments in which the sled 400 is embodied as a storage sled, or a set of memory devices in embodiments in which the sled 400 is embodied as a memory sled.

The sled 400 also includes one or more additional physical resources 630 mounted to the top side 650 of the chassis-less circuit board substrate 602. In the illustrative embodiment, the additional physical resources include a network interface controller (NIC) as discussed in more detail below. Of course, depending on the type and functionality of the sled 400, the physical resources 630 may include additional or other electrical components, circuits, and/or devices in other embodiments.

The physical resources 620 are communicatively coupled to the physical resources 630 via an input/output (I/O) subsystem 622. The I/O subsystem 622 may be embodied as circuitry and/or components to facilitate input/output operations with the physical resources 620, the physical resources 630, and/or other components of the sled 400. For example, the I/O subsystem 622 may be embodied as, or otherwise include, memory controller hubs, input/output control hubs, integrated sensor hubs, firmware devices, communication links (e.g., point-to-point links, bus links, wires, cables, waveguides, light guides, printed circuit board traces, etc.), and/or other components and subsystems to facilitate the input/output operations. In the illustrative embodiment, the I/O subsystem 622 is embodied as, or otherwise includes, a double data rate 4 (DDR4) data bus or a DDR5 data bus, as described further below.

In some embodiments, the sled 400 may also include a resource-to-resource interconnect 624. The resource-to-resource interconnect 624 may be embodied as any type of communication interconnect capable of facilitating resource-to-resource communications. In the illustrative embodiment, the resource-to-resource interconnect 624 is embodied as a high-speed point-to-point interconnect (e.g., faster than the I/O subsystem 622). For example, the resource-to-resource interconnect 624 may be embodied as a QuickPath Interconnect (QPI), an UltraPath Interconnect (UPI), or other high-speed point-to-point interconnect dedicated to resource-to-resource communications.

The sled 400 also includes a power connector 640 configured to mate with a corresponding power connector of the rack 240 when the sled 400 is mounted in the corresponding rack 240. The sled 400 receives power from a power supply of the rack 240 via the power connector 640 to supply power to the various electrical components of the sled 400. That is, the sled 400 does not include any local power supply (i.e., an on-board power supply) to provide power to the electrical components of the sled 400. The exclusion of a local or on-board power supply facilitates the reduction in the overall footprint of the chassis-less circuit board substrate 602, which may increase the thermal cooling characteristics of the various electrical components mounted on the chassis-less circuit board substrate 602 as discussed above. In some embodiments, voltage regulators are placed on a bottom side 750 (see FIG. 7) of the chassis-less circuit board substrate 602 directly opposite of the processors 820 (see FIG. 8), and power is routed from the voltage regulators to the processors 820 by vias extending through the circuit board substrate 602. Such a configuration provides an increased thermal budget, additional current and/or voltage, and better voltage control relative to typical printed circuit boards in which processor power is delivered from a voltage regulator, in part, by printed circuit traces.

In some embodiments, the sled 400 may also include mounting features 642 configured to mate with a mounting arm, or other structure, of a robot to facilitate the placement of the sled 600 in a rack 240 by the robot. The mounting features 642 may be embodied as any type of physical structures that allow the robot to grasp the sled 400 without damaging the chassis-less circuit board substrate 602 or the electrical components mounted thereto. For example, in some embodiments, the mounting features 642 may be embodied as non-conductive pads attached to the chassis-less circuit board substrate 602. In other embodiments, the mounting features may be embodied as brackets, braces, or other similar structures attached to the chassis-less circuit board substrate 602. The particular number, shape, size, and/or make-up of the mounting feature 642 may depend on the design of the robot configured to manage the sled 400.

Figure 7:
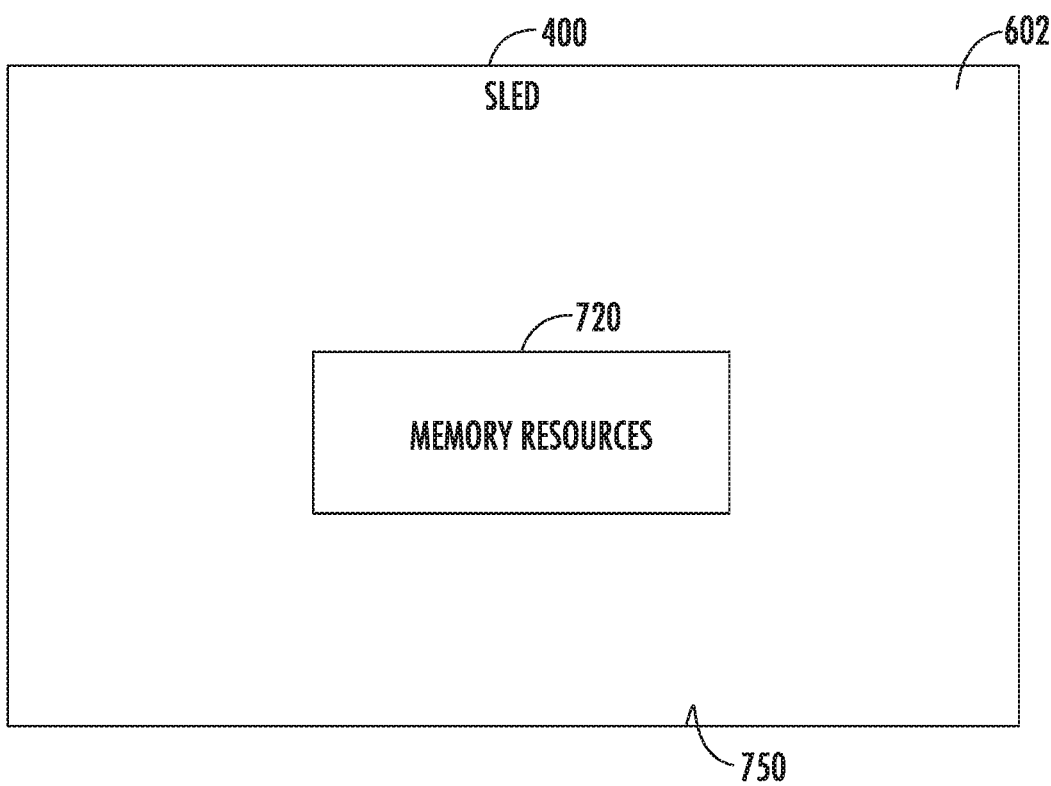
FIG. 7 is a simplified block diagram of at least one embodiment of a bottom side of the sled of FIG. 6.

Referring now to FIG. 7, in addition to the physical resources 630 mounted on the top side 650 of the chassis-less circuit board substrate 602, the sled 400 also includes one or more memory devices 720 mounted to a bottom side 750 of the chassis-less circuit board substrate 602. That is, the chassis-less circuit board substrate 602 is embodied as a double-sided circuit board. The physical resources 620 are communicatively coupled to the memory devices 720 via the I/O subsystem 622. For example, the physical resources 620 and the memory devices 720 may be communicatively coupled by one or more vias extending through the chassis-less circuit board substrate 602. Each physical resource 620 may be communicatively coupled to a different set of one or more memory devices 720 in some embodiments. Alternatively, in other embodiments, each physical resource 620 may be communicatively coupled to each memory device 720.

The memory devices 720 may be embodied as any type of memory device capable of storing data for the physical resources 620 during operation of the sled 400, such as any type of volatile (e.g., dynamic random access memory (DRAM), etc.) or nonvolatile memory. Volatile memory may be a memory that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by the Joint Electronic Device Engineering Council (JEDEC), such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the memory devices that implement such standards may be referred to as DDR-based interfaces.

In one embodiment, the memory device is a block addressable memory device, such as those based on NAND or NOR technologies, such as multi-threshold level NAND flash memory or NOR flash memory. A memory device may also include byte addressable write-in-place nonvolatile memory devices, such as Intel 3D XPoint™ memory, Intel Optane™ memory, Micron QuantX™ memory, magnetoresistive random access memory (MRAM) memory that incorporates memristor technology, or other byte addressable write-in-place nonvolatile memory devices. In some embodiments, the memory device may comprise a transistor-less stackable cross point architecture in which memory cells sit at the intersection of word lines and bit lines and are individually addressable and in which bit storage is based on a change in bulk resistance. In one embodiment, the memory device may be or may include memory devices that use chalcogenide glass, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product.

Figure 8:
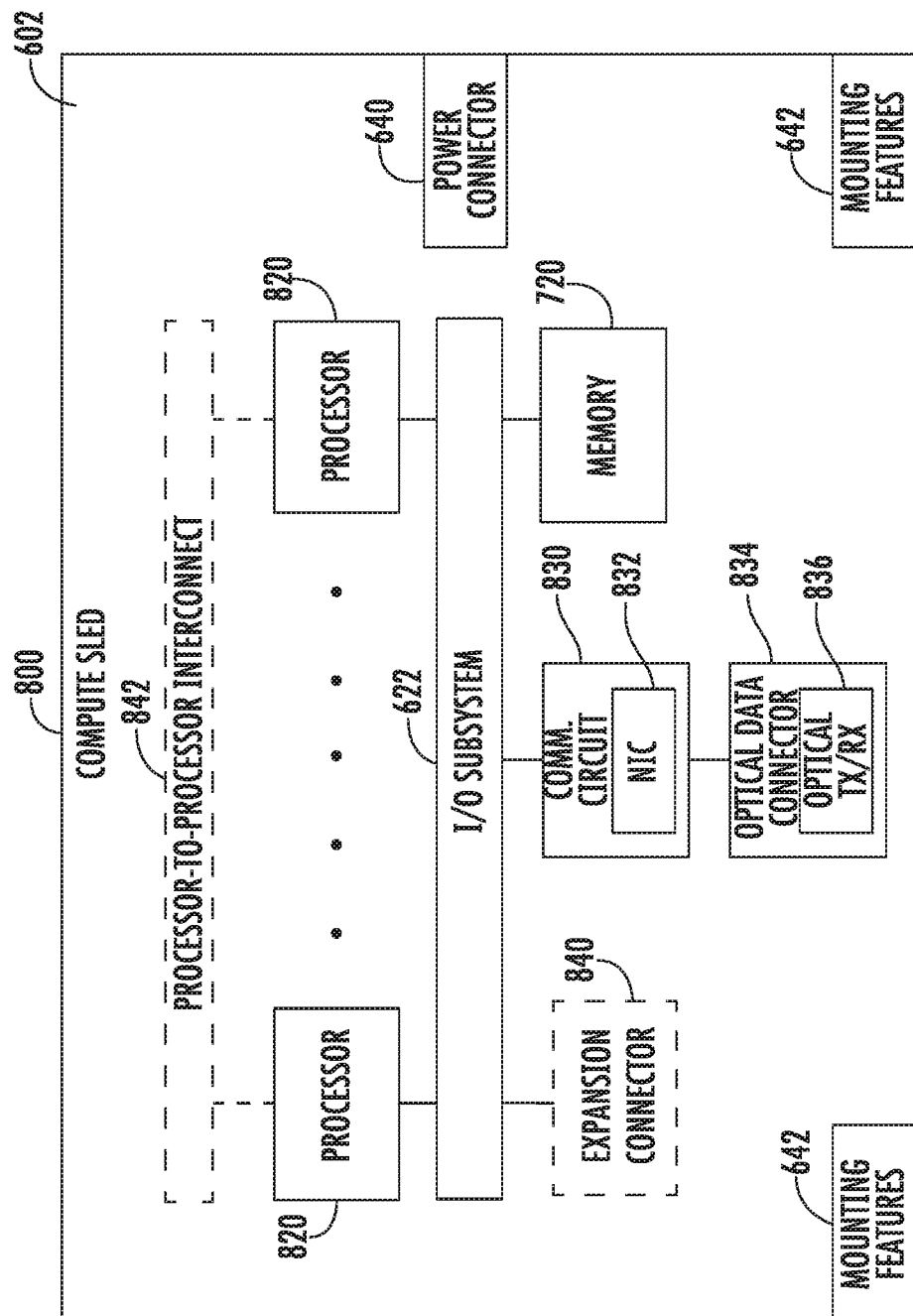
FIG. 8 is a simplified block diagram of at least one embodiment of a compute sled usable in the data center of FIG. 1.

Referring now to FIG. 8, in some embodiments, the sled 400 may be embodied as a compute sled 800. The compute sled 800 is optimized, or otherwise configured, to perform compute tasks. Of course, as discussed above, the compute sled 800 may rely on other sleds, such as acceleration sleds and/or storage sleds, to perform such compute tasks. The compute sled 800 includes various physical resources (e.g., electrical components) similar to the physical resources of the sled 400, which have been identified in FIG. 8 using the same reference numbers. The description of such components provided above in regard to FIGS. 6 and 7 applies to the corresponding components of the compute sled 800 and is not repeated herein for clarity of the description of the compute sled 800.

In the illustrative compute sled 800, the physical resources 620 are embodied as processors 820. Although only two processors 820 are shown in FIG. 8, it should be appreciated that the compute sled 800 may include additional processors 820 in other embodiments. Illustratively, the processors 820 are embodied as high-performance processors 820 and may be configured to operate at a relatively high power rating. Although the processors 820 generate additional heat operating at power ratings greater than typical processors (which operate at around 155-230 W), the enhanced thermal cooling characteristics of the chassis-less circuit board substrate 602 discussed above facilitate the higher power operation. For example, in the illustrative embodiment, the processors 820 are configured to operate at a power rating of at least 250 W. In some embodiments, the processors 820 may be configured to operate at a power rating of at least 350 W.

In some embodiments, the compute sled 800 may also include a processor-to-processor interconnect 842. Similar to the resource-to-resource interconnect 624 of the sled 400 discussed above, the processor-to-processor interconnect 842 may be embodied as any type of communication interconnect capable of facilitating processor-to-processor interconnect 842 communications. In the illustrative embodiment, the processor-to-processor interconnect 842 is embodied as a high-speed point-to-point interconnect (e.g., faster than the I/O subsystem 622). For example, the processor-to-processor interconnect 842 may be embodied as a QuickPath Interconnect (QPI), an UltraPath Interconnect (UPI), or other high-speed point-to-point interconnect dedicated to processor-to-processor communications.

The compute sled 800 also includes a communication circuit 830. The illustrative communication circuit 830 includes a network interface controller (NIC) 832, which may also be referred to as a host fabric interface (HFI). The NIC 832 may be embodied as, or otherwise include, any type of integrated circuit, discrete circuits, controller chips, chipsets, add-in-boards, daughtercards, network interface cards, or other devices that may be used by the compute sled 800 to connect with another compute device (e.g., with other sleds 400). In some embodiments, the NIC 832 may be embodied as part of a system-on-a-chip (SoC) that includes one or more processors, or included on a multichip package that also contains one or more processors. In some embodiments, the NIC 832 may include a local processor (not shown) and/or a local memory (not shown) that are both local to the NIC 832. In such embodiments, the local processor of the NIC 832 may be capable of performing one or more of the functions of the processors 820. Additionally or alternatively, in such embodiments, the local memory of the NIC 832 may be integrated into one or more components of the compute sled at the board level, socket level, chip level, and/or other levels.

The communication circuit 830 is communicatively coupled to an optical data connector 834. The optical data connector 834 is configured to mate with a corresponding optical data connector of the rack 240 when the compute sled 800 is mounted in the rack 240. Illustratively, the optical data connector 834 includes a plurality of optical fibers which lead from a mating surface of the optical data connector 834 to an optical transceiver 836. The optical transceiver 836 is configured to convert incoming optical signals from the rack-side optical data connector to electrical signals and to convert electrical signals to outgoing optical signals to the rack-side optical data connector. Although shown as forming part of the optical data connector 834 in the illustrative embodiment, the optical transceiver 836 may form a portion of the communication circuit 830 in other embodiments.

In some embodiments, the compute sled 800 may also include an expansion connector 840. In such embodiments, the expansion connector 840 is configured to mate with a corresponding connector of an expansion chassis-less circuit board substrate to provide additional physical resources to the compute sled 800. The additional physical resources may be used, for example, by the processors 820 during operation of the compute sled 800. The expansion chassis-less circuit board substrate may be substantially similar to the chassis-less circuit board substrate 602 discussed above and may include various electrical components mounted thereto. The particular electrical components mounted to the expansion chassis-less circuit board substrate may depend on the intended functionality of the expansion chassis-less circuit board substrate. For example, the expansion chassis-less circuit board substrate may provide additional compute resources, memory resources, and/or storage resources. As such, the additional physical resources of the expansion chassis-less circuit board substrate may include, but is not limited to, processors, memory devices, storage devices, and/or accelerator circuits including, for example, field programmable gate arrays (FPGA), application-specific integrated circuits (ASICs), security co-processors, graphics processing units (GPUs), machine learning circuits, or other specialized processors, controllers, devices, and/or circuits.

Figure 9:
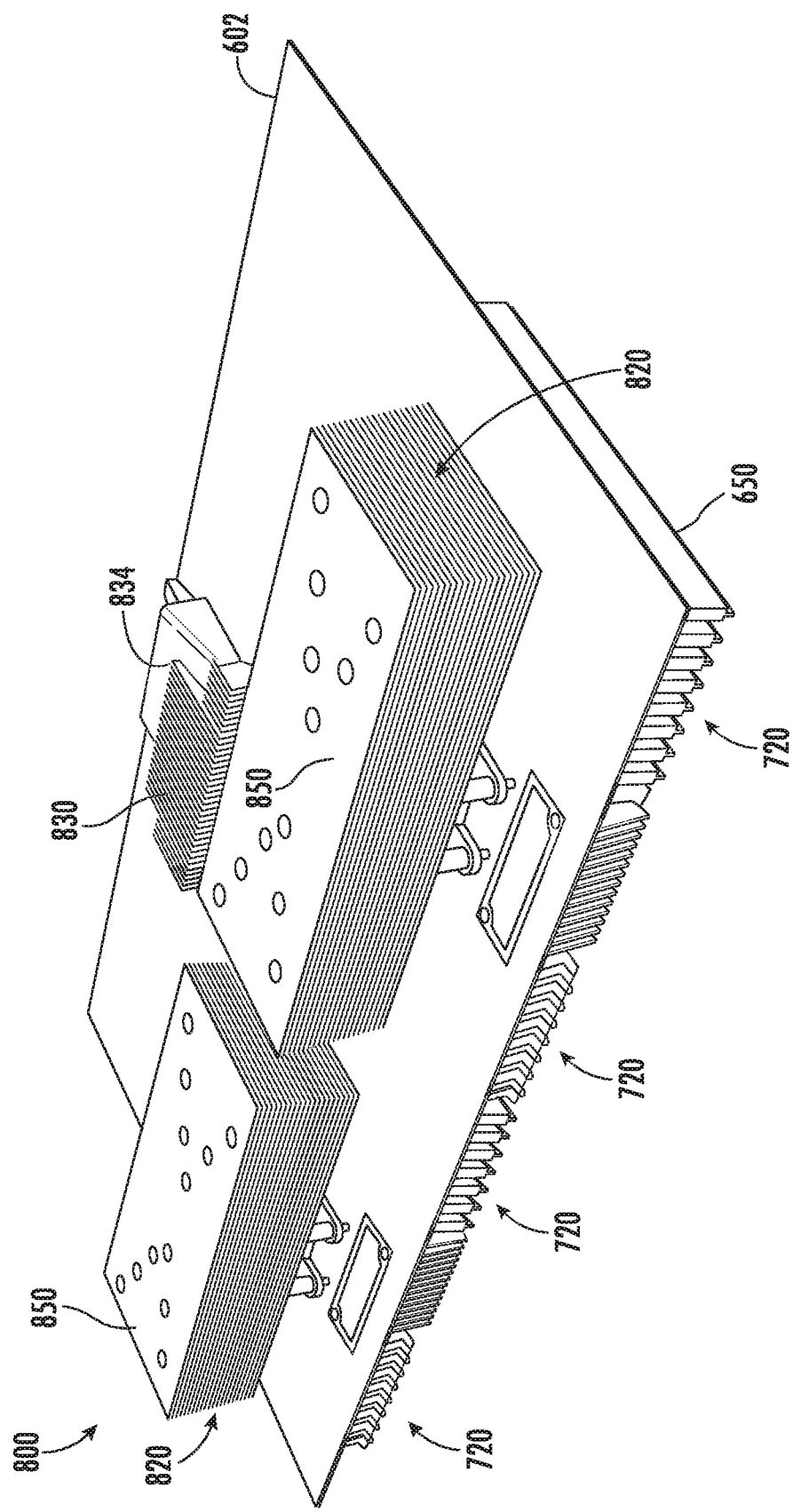
FIG. 9 is a top perspective view of at least one embodiment of the compute sled of FIG. 8.

Referring now to FIG. 9, an illustrative embodiment of the compute sled 800 is shown. As shown, the processors 820, communication circuit 830, and optical data connector 834 are mounted to the top side 650 of the chassis-less circuit board substrate 602. Any suitable attachment or mounting technology may be used to mount the physical resources of the compute sled 800 to the chassis-less circuit board substrate 602. For example, the various physical resources may be mounted in corresponding sockets (e.g., a processor socket), holders, or brackets. In some cases, some of the electrical components may be directly mounted to the chassis-less circuit board substrate 602 via soldering or similar techniques.

As discussed above, the individual processors 820 and communication circuit 830 are mounted to the top side 650 of the chassis-less circuit board substrate 602 such that no two heat-producing, electrical components shadow each other. In the illustrative embodiment, the processors 820 and communication circuit 830 are mounted in corresponding locations on the top side 650 of the chassis-less circuit board substrate 602 such that no two of those physical resources are linearly in-line with others along the direction of the airflow path 608. It should be appreciated that, although the optical data connector 834 is in-line with the communication circuit 830, the optical data connector 834 produces no or nominal heat during operation.

The memory devices 720 of the compute sled 800 are mounted to the bottom side 750 of the of the chassis-less circuit board substrate 602 as discussed above in regard to the sled 400. Although mounted to the bottom side 750, the memory devices 720 are communicatively coupled to the processors 820 located on the top side 650 via the I/O subsystem 622. Because the chassis-less circuit board substrate 602 is embodied as a double-sided circuit board, the memory devices 720 and the processors 820 may be communicatively coupled by one or more vias, connectors, or other mechanisms extending through the chassis-less circuit board substrate 602. Of course, each processor 820 may be communicatively coupled to a different set of one or more memory devices 720 in some embodiments. Alternatively, in other embodiments, each processor 820 may be communicatively coupled to each memory device 720. In some embodiments, the memory devices 720 may be mounted to one or more memory mezzanines on the bottom side of the chassis-less circuit board substrate 602 and may interconnect with a corresponding processor 820 through a ball-grid array.

Each of the processors 820 includes a heat sink 850 secured thereto. Due to the mounting of the memory devices 720 to the bottom side 750 of the chassis-less circuit board substrate 602 (as well as the vertical spacing of the sleds 400 in the corresponding rack 240), the top side 650 of the chassis-less circuit board substrate 602 includes additional "free" area or space that facilitates the use of heat sinks 850 having a larger size relative to traditional heat sinks used in typical servers. Additionally, due to the improved thermal cooling characteristics of the chassis-less circuit board substrate 602, none of the processor heat sinks 850 include cooling fans attached thereto. That is, each of the heat sinks 850 is embodied as a fan-less heat sink. In some embodiments, the heat sinks 850 mounted atop the processors 820 may overlap with the heat sink attached to the communication circuit 830 in the direction of the airflow path 608 due to their increased size, as illustratively suggested by FIG. 9.

Figure 10:
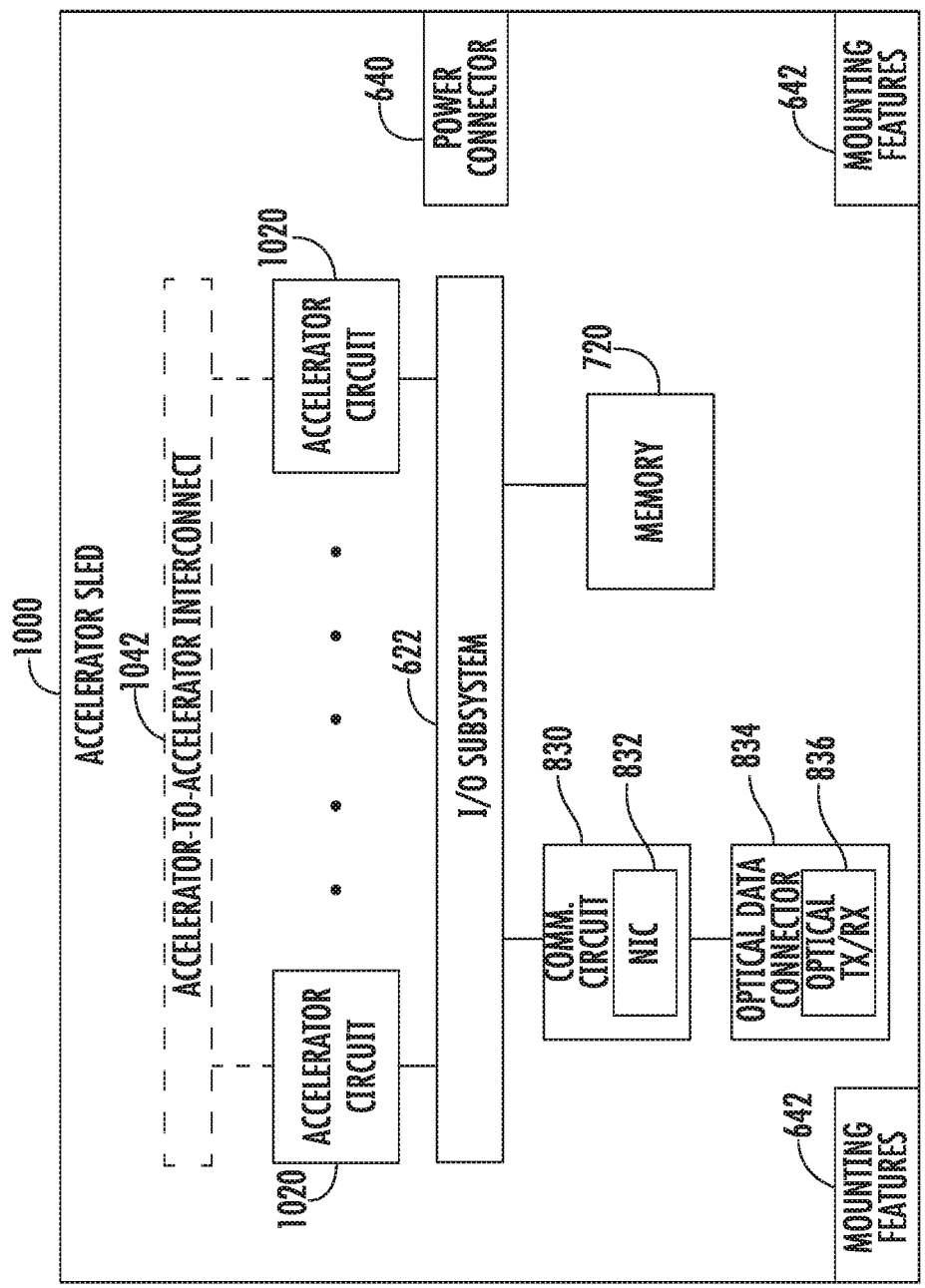
FIG. 10 is a simplified block diagram of at least one embodiment of an accelerator sled usable in the data center of FIG. 1.

Referring now to FIG. 10, in some embodiments, the sled 400 may be embodied as an accelerator sled 1000. The accelerator sled 1000 is configured, to perform specialized compute tasks, such as machine learning, encryption, hashing, or other computational-intensive task. In some embodiments, for example, a compute sled 800 may offload tasks to the accelerator sled 1000 during operation. The accelerator sled 1000 includes various components similar to components of the sled 400 and/or compute sled 800, which have been identified in FIG. 10 using the same reference numbers. The description of such components provided above in regard to FIGS. 6, 7, and 8 apply to the corresponding components of the accelerator sled 1000 and is not repeated herein for clarity of the description of the accelerator sled 1000.

Figure 11:
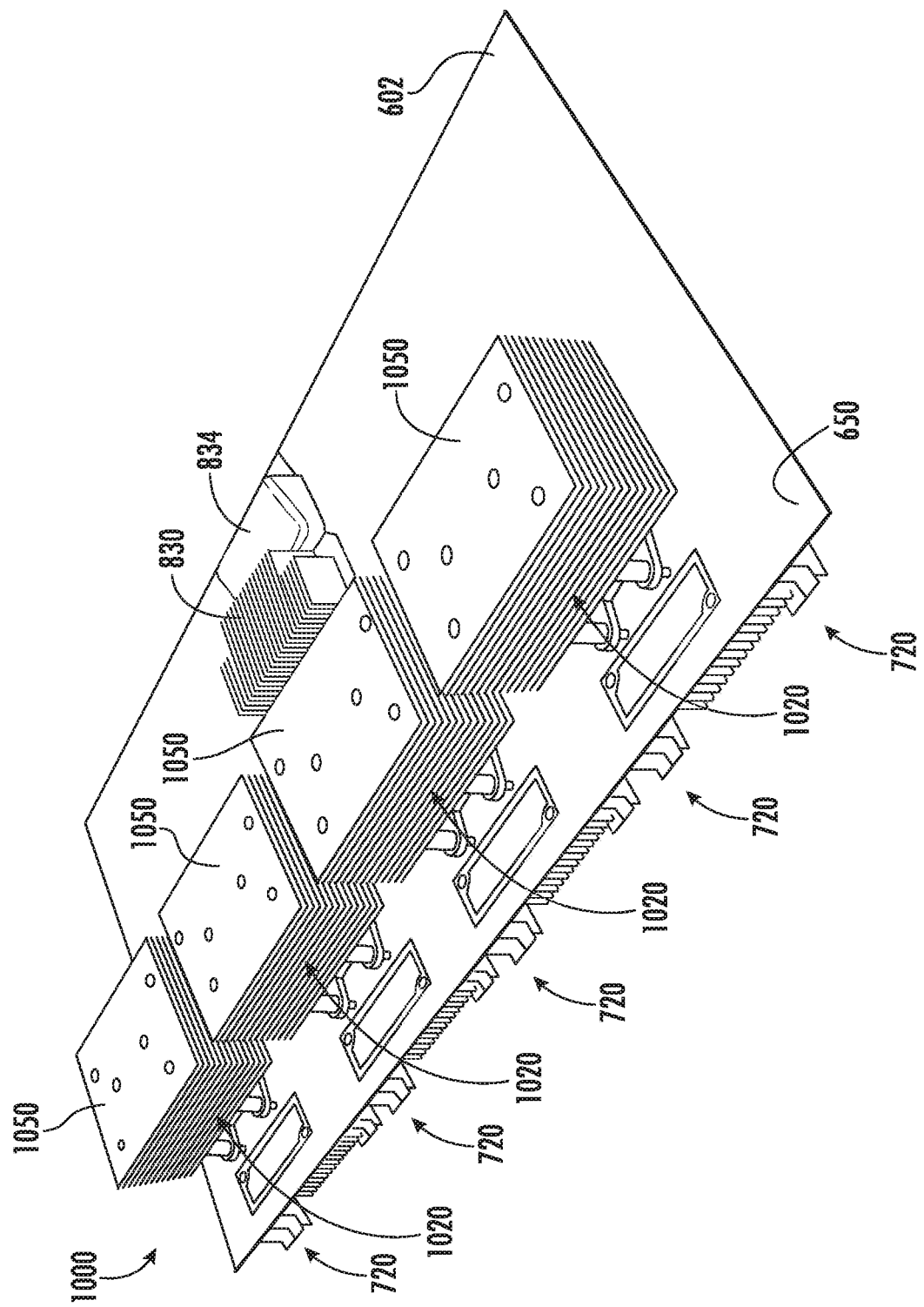
FIG. 11 is a top perspective view of at least one embodiment of the accelerator sled of FIG. 10.

In the illustrative accelerator sled 1000, the physical resources 620 are embodied as accelerator circuits 1020. Although only two accelerator circuits 1020 are shown in FIG. 10, it should be appreciated that the accelerator sled 1000 may include additional accelerator circuits 1020 in other embodiments. For example, as shown in FIG. 11, the accelerator sled 1000 may include four accelerator circuits 1020 in some embodiments. The accelerator circuits 1020 may be embodied as any type of processor, co-processor, compute circuit, or other device capable of performing compute or processing operations. For example, the accelerator circuits 1020 may be embodied as, for example, field programmable gate arrays (FPGA), application-specific integrated circuits (ASICs), security co-processors, graphics processing units (GPUs), neuromorphic processor units, quantum computers, machine learning circuits, or other specialized processors, controllers, devices, and/or circuits.

In some embodiments, the accelerator sled 1000 may also include an accelerator-to-accelerator interconnect 1042. Similar to the resource-to-resource interconnect 624 of the sled 600 discussed above, the accelerator-to-accelerator interconnect 1042 may be embodied as any type of communication interconnect capable of facilitating accelerator-to-accelerator communications. In the illustrative embodiment, the accelerator-to-accelerator interconnect 1042 is embodied as a high-speed point-to-point interconnect (e.g., faster than the I/O subsystem 622). For example, the accelerator-to-accelerator interconnect 1042 may be embodied as a QuickPath Interconnect (QPI), an UltraPath Interconnect (UPI), or other high-speed point-to-point interconnect dedicated to processor-to-processor communications. In some embodiments, the accelerator circuits 1020 may be daisy-chained with a primary accelerator circuit 1020 connected to the NIC 832 and memory 720 through the I/O subsystem 622 and a secondary accelerator circuit 1020 connected to the NIC 832 and memory 720 through a primary accelerator circuit 1020.

Referring now to FIG. 11, an illustrative embodiment of the accelerator sled 1000 is shown. As discussed above, the accelerator circuits 1020, communication circuit 830, and optical data connector 834 are mounted to the top side 650 of the chassis-less circuit board substrate 602. Again, the individual accelerator circuits 1020 and communication circuit 830 are mounted to the top side 650 of the chassis-less circuit board substrate 602 such that no two heat-producing, electrical components shadow each other as discussed above. The memory devices 720 of the accelerator sled 1000 are mounted to the bottom side 750 of the of the chassis-less circuit board substrate 602 as discussed above in regard to the sled 600. Although mounted to the bottom side 750, the memory devices 720 are communicatively coupled to the accelerator circuits 1020 located on the top side 650 via the I/O subsystem 622 (e.g., through vias). Further, each of the accelerator circuits 1020 may include a heat sink 1070 that is larger than a traditional heat sink used in a server. As discussed above with reference to the heat sinks 870, the heat sinks 1070 may be larger than traditional heat sinks because of the "free" area provided by the memory resources 720 being located on the bottom side 750 of the chassis-less circuit board substrate 602 rather than on the top side 650.

Figure 12:
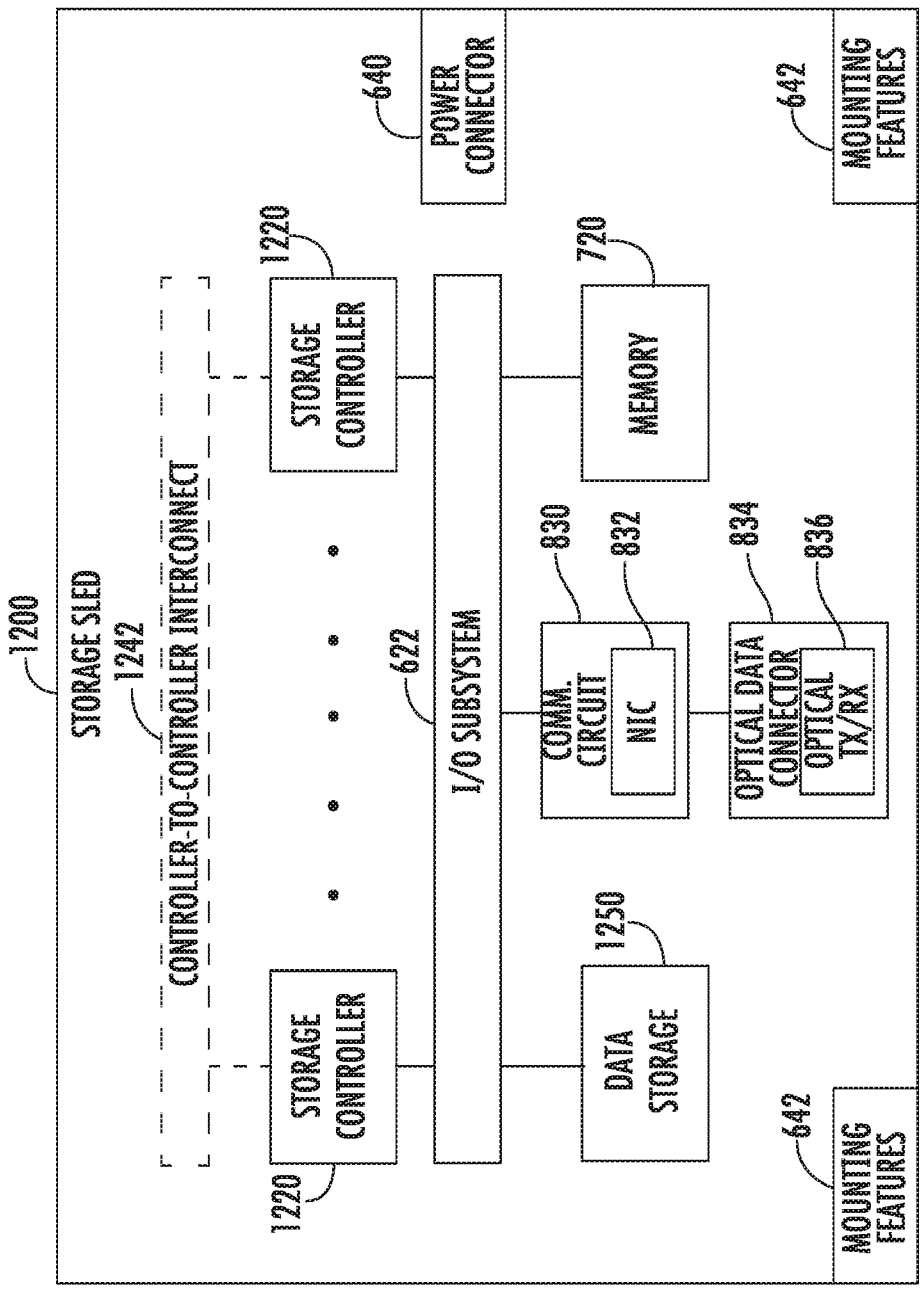
FIG. 12 is a simplified block diagram of at least one embodiment of a storage sled usable in the data center of FIG. 1.

Referring now to FIG. 12, in some embodiments, the sled 400 may be embodied as a storage sled 1200. The storage sled 1200 is configured, to store data in a data storage 1250 local to the storage sled 1200. For example, during operation, a compute sled 800 or an accelerator sled 1000 may store and retrieve data from the data storage 1250 of the storage sled 1200. The storage sled 1200 includes various components similar to components of the sled 400 and/or the compute sled 800, which have been identified in FIG. 12 using the same reference numbers. The description of such components provided above in regard to FIGS. 6, 7, and 8 apply to the corresponding components of the storage sled 1200 and is not repeated herein for clarity of the description of the storage sled 1200.

In the illustrative storage sled 1200, the physical resources 620 are embodied as storage controllers 1220. Although only two storage controllers 1220 are shown in FIG. 12, it should be appreciated that the storage sled 1200 may include additional storage controllers 1220 in other embodiments. The storage controllers 1220 may be embodied as any type of processor, controller, or control circuit capable of controlling the storage and retrieval of data into the data storage 1250 based on requests received via the communication circuit 830. In the illustrative embodiment, the storage controllers 1220 are embodied as relatively low-power processors or controllers. For example, in some embodiments, the storage controllers 1220 may be configured to operate at a power rating of about 75 watts.

In some embodiments, the storage sled 1200 may also include a controller-to-controller interconnect 1242. Similar to the resource-to-resource interconnect 624 of the sled 400 discussed above, the controller-to-controller interconnect 1242 may be embodied as any type of communication interconnect capable of facilitating controller-to-controller communications. In the illustrative embodiment, the controller-to-controller interconnect 1242 is embodied as a high-speed point-to-point interconnect (e.g., faster than the I/O subsystem 622). For example, the controller-to-controller interconnect 1242 may be embodied as a QuickPath Interconnect (QPI), an UltraPath Interconnect (UPI), or other high-speed point-to-point interconnect dedicated to processor-to-processor communications.

Figure 13:
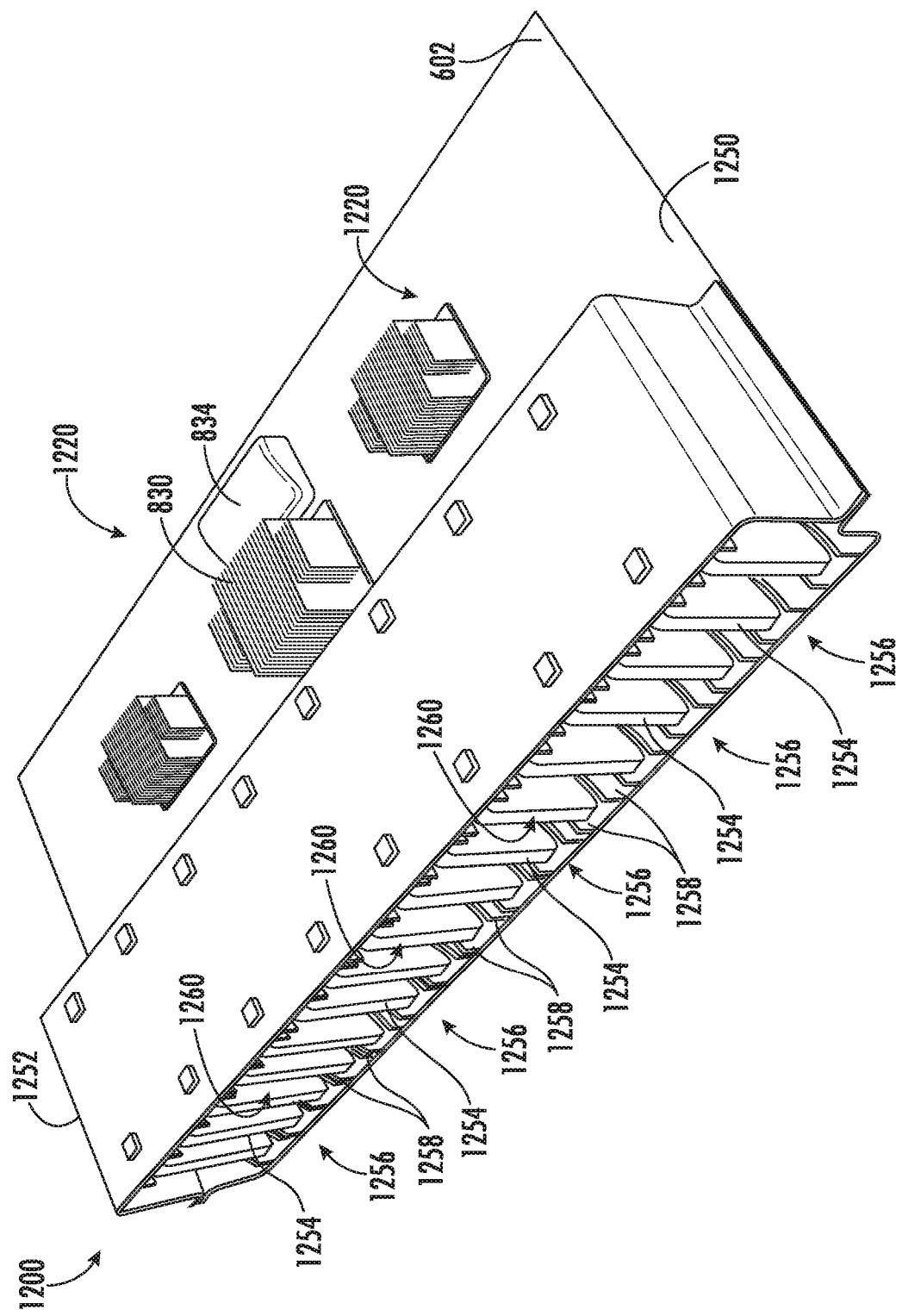
FIG. 13 is a top perspective view of at least one embodiment of the storage sled of FIG. 12.

Referring now to FIG. 13, an illustrative embodiment of the storage sled 1200 is shown. In the illustrative embodiment, the data storage 1250 is embodied as, or otherwise includes, a storage cage 1252 configured to house one or more solid state drives (SSDs) 1254. To do so, the storage cage 1252 includes a number of mounting slots 1256, each of which is configured to receive a corresponding solid state drive 1254. Each of the mounting slots 1256 includes a number of drive guides 1258 that cooperate to define an access opening 1260 of the corresponding mounting slot 1256. The storage cage 1252 is secured to the chassis-less circuit board substrate 602 such that the access openings face away from (i.e., toward the front of) the chassis-less circuit board substrate 602. As such, solid state drives 1254 are accessible while the storage sled 1200 is mounted in a corresponding rack 204. For example, a solid state drive 1254 may be swapped out of a rack 240 (e.g., via a robot) while the storage sled 1200 remains mounted in the corresponding rack 240.

The storage cage 1252 illustratively includes sixteen mounting slots 1256 and is capable of mounting and storing sixteen solid state drives 1254. Of course, the storage cage 1252 may be configured to store additional or fewer solid state drives 1254 in other embodiments. Additionally, in the illustrative embodiment, the solid state drivers are mounted vertically in the storage cage 1252, but may be mounted in the storage cage 1252 in a different orientation in other embodiments. Each solid state drive 1254 may be embodied as any type of data storage device capable of storing long term data. To do so, the solid state drives 1254 may include volatile and nonvolatile memory devices discussed above.

As shown in FIG. 13, the storage controllers 1220, the communication circuit 830, and the optical data connector 834 are illustratively mounted to the top side 650 of the chassis-less circuit board substrate 602. Again, as discussed above, any suitable attachment or mounting technology may be used to mount the electrical components of the storage sled 1200 to the chassis-less circuit board substrate 602 including, for example, sockets (e.g., a processor socket), holders, brackets, soldered connections, and/or other mounting or securing techniques.

As discussed above, the individual storage controllers 1220 and the communication circuit 830 are mounted to the top side 650 of the chassis-less circuit board substrate 602 such that no two heat-producing, electrical components shadow each other. For example, the storage controllers 1220 and the communication circuit 830 are mounted in corresponding locations on the top side 650 of the chassis-less circuit board substrate 602 such that no two of those electrical components are linearly in-line with each other along the direction of the airflow path 608.

The memory devices 720 of the storage sled 1200 are mounted to the bottom side 750 of the of the chassis-less circuit board substrate 602 as discussed above in regard to the sled 400. Although mounted to the bottom side 750, the memory devices 720 are communicatively coupled to the storage controllers 1220 located on the top side 650 via the I/O subsystem 622. Again, because the chassis-less circuit board substrate 602 is embodied as a double-sided circuit board, the memory devices 720 and the storage controllers 1220 may be communicatively coupled by one or more vias, connectors, or other mechanisms extending through the chassis-less circuit board substrate 602. Each of the storage controllers 1220 includes a heat sink 1270 secured thereto. As discussed above, due to the improved thermal cooling characteristics of the chassis-less circuit board substrate 602 of the storage sled 1200, none of the heat sinks 1270 include cooling fans attached thereto. That is, each of the heat sinks 1270 is embodied as a fan-less heat sink.

Figure 14:
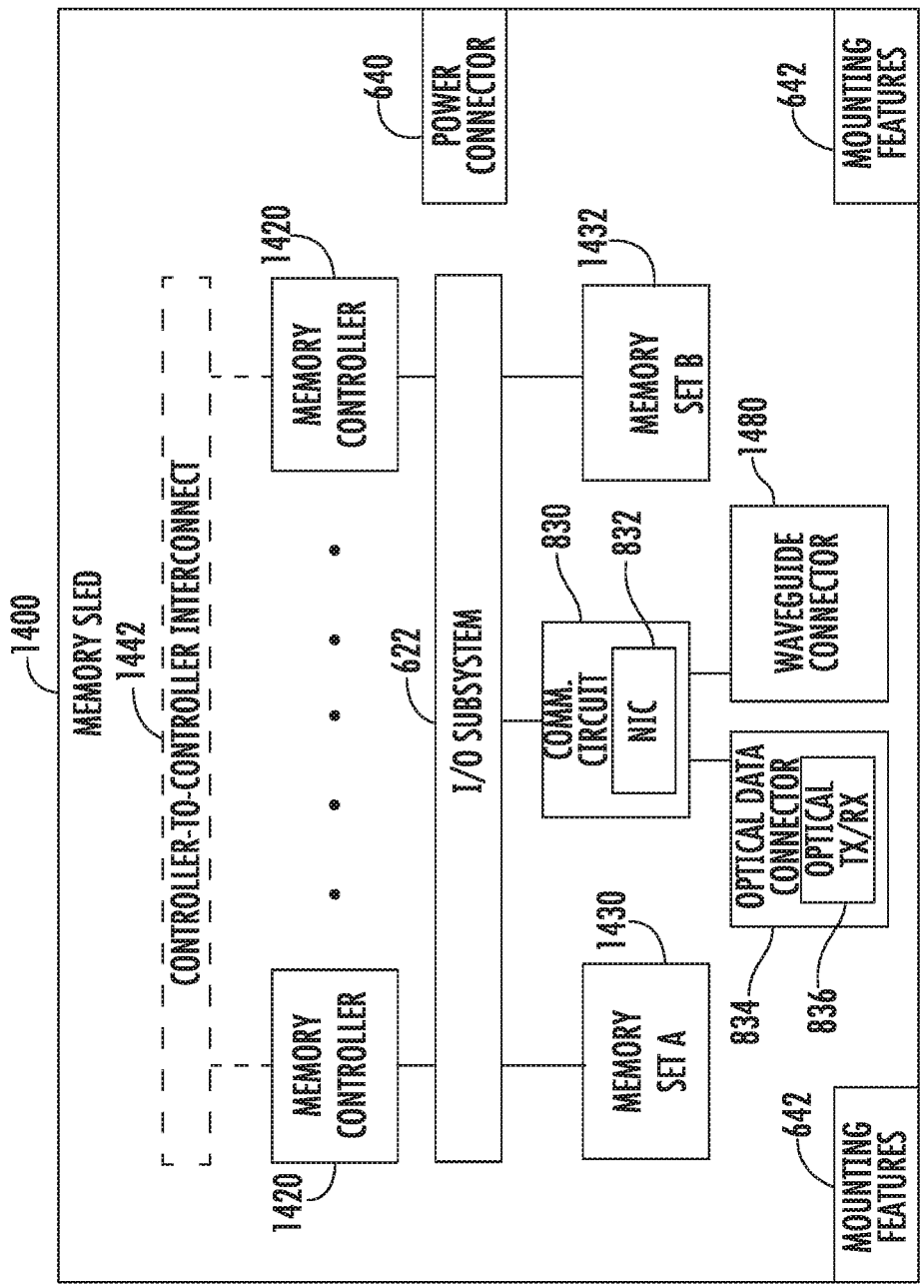
FIG. 14 is a simplified block diagram of at least one embodiment of a memory sled usable in the data center of FIG. 1.

Referring now to FIG. 14, in some embodiments, the sled 400 may be embodied as a memory sled 1400. The storage sled 1400 is optimized, or otherwise configured, to provide other sleds 400 (e.g., compute sleds 800, accelerator sleds 1000, etc.) with access to a pool of memory (e.g., in two or more sets 1430, 1432 of memory devices 720) local to the memory sled 1200. For example, during operation, a compute sled 800 or an accelerator sled 1000 may remotely write to and/or read from one or more of the memory sets 1430, 1432 of the memory sled 1200 using a logical address space that maps to physical addresses in the memory sets 1430, 1432. The memory sled 1400 includes various components similar to components of the sled 400 and/or the compute sled 800, which have been identified in FIG. 14 using the same reference numbers. The description of such components provided above in regard to FIGS. 6, 7, and 8 apply to the corresponding components of the memory sled 1400 and is not repeated herein for clarity of the description of the memory sled 1400.

In the illustrative memory sled 1400, the physical resources 620 are embodied as memory controllers 1420. Although only two memory controllers 1420 are shown in FIG. 14, it should be appreciated that the memory sled 1400 may include additional memory controllers 1420 in other embodiments. The memory controllers 1420 may be embodied as any type of processor, controller, or control circuit capable of controlling the writing and reading of data into the memory sets 1430, 1432 based on requests received via the communication circuit 830. In the illustrative embodiment, each memory controller 1420 is connected to a corresponding memory set 1430, 1432 to write to and read from memory devices 720 within the corresponding memory set 1430, 1432 and enforce any permissions (e.g., read, write, etc.) associated with sled 400 that has sent a request to the memory sled 1400 to perform a memory access operation (e.g., read or write).

In some embodiments, the memory sled 1400 may also include a controller-to-controller interconnect 1442. Similar to the resource-to-resource interconnect 624 of the sled 400 discussed above, the controller-to-controller interconnect 1442 may be embodied as any type of communication interconnect capable of facilitating controller-to-controller communications. In the illustrative embodiment, the controller-to-controller interconnect 1442 is embodied as a high-speed point-to-point interconnect (e.g., faster than the I/O subsystem 622). For example, the controller-to-controller interconnect 1442 may be embodied as a QuickPath Interconnect (QPI), an UltraPath Interconnect (UPI), or other high-speed point-to-point interconnect dedicated to processor-to-processor communications. As such, in some embodiments, a memory controller 1420 may access, through the controller-to-controller interconnect 1442, memory that is within the memory set 1432 associated with another memory controller 1420. In some embodiments, a scalable memory controller is made of multiple smaller memory controllers, referred to herein as "chiplets", on a memory sled (e.g., the memory sled 1400). The chiplets may be interconnected (e.g., using EMIB (Embedded Multi-Die Interconnect Bridge)). The combined chiplet memory controller may scale up to a relatively large number of memory controllers and I/O ports, (e.g., up to 16 memory channels). In some embodiments, the memory controllers 1420 may implement a memory interleave (e.g., one memory address is mapped to the memory set 1430, the next memory address is mapped to the memory set 1432, and the third address is mapped to the memory set 1430, etc.). The interleaving may be managed within the memory controllers 1420, or from CPU sockets (e.g., of the compute sled 800) across network links to the memory sets 1430, 1432, and may improve the latency associated with performing memory access operations as compared to accessing contiguous memory addresses from the same memory device.

Further, in some embodiments, the memory sled 1400 may be connected to one or more other sleds 400 (e.g., in the same rack 240 or an adjacent rack 240) through a waveguide, using the waveguide connector 1480. In the illustrative embodiment, the waveguides are 64 millimeter waveguides that provide 16 Rx (i.e., receive) lanes and 16 Tx (i.e., transmit) lanes. Each lane, in the illustrative embodiment, is either 16 GHz or 32 GHz. In other embodiments, the frequencies may be different. Using a waveguide may provide high throughput access to the memory pool (e.g., the memory sets 1430, 1432) to another sled (e.g., a sled 400 in the same rack 240 or an adjacent rack 240 as the memory sled 1400) without adding to the load on the optical data connector 834.

Figure 15:
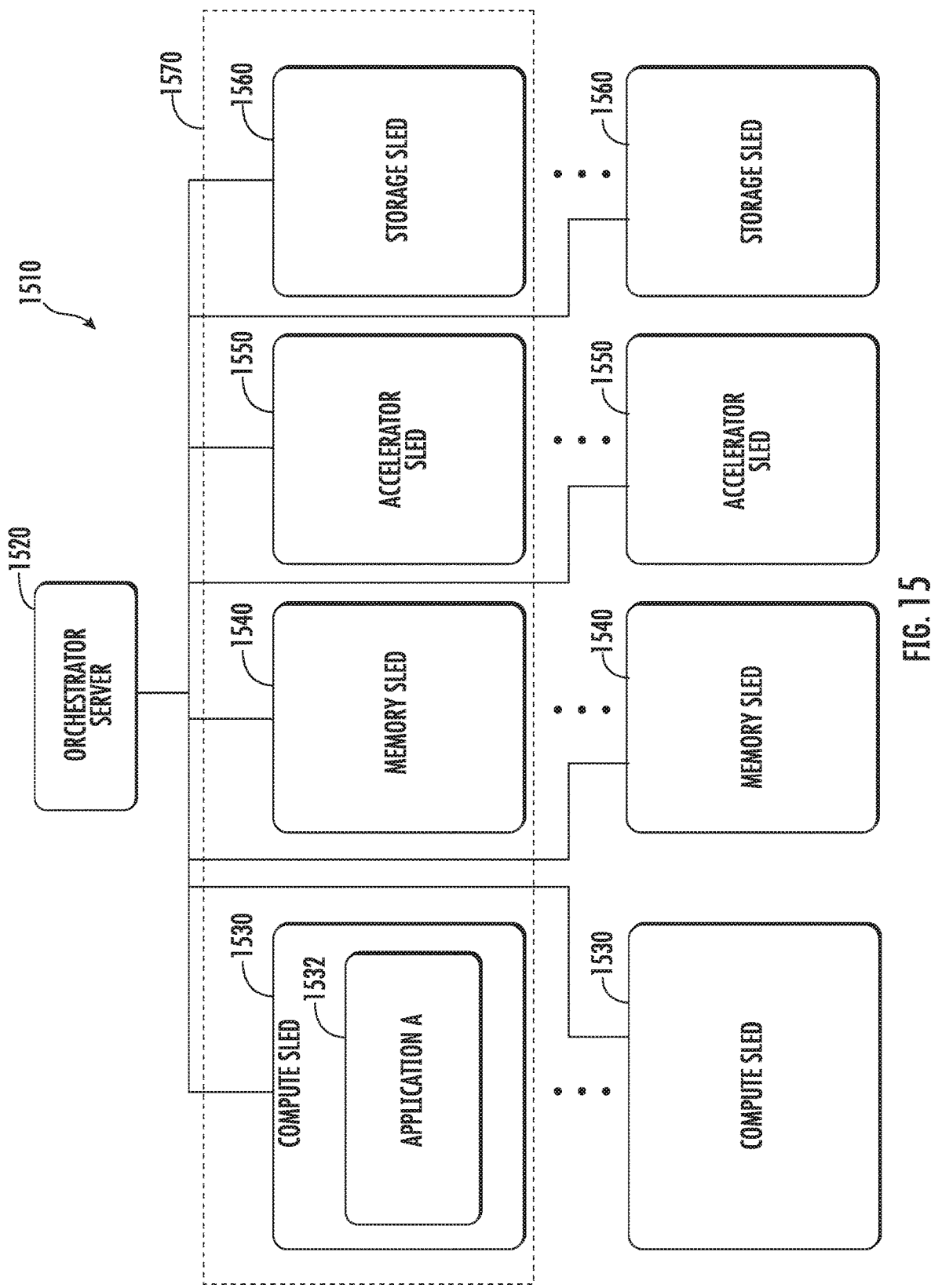
FIG. 15 is a simplified block diagram of a system that may be established within the data center of FIG. 1 to execute workloads with managed nodes composed of disaggregated resources.

Referring now to FIG. 15, a system for executing one or more workloads (e.g., applications) may be implemented in accordance with the data center 100. In the illustrative embodiment, the system 1510 includes an orchestrator server 1520, which may be embodied as a managed node comprising a compute device (e.g., a processor 820 on a compute sled 800) executing management software (e.g., a cloud operating environment, such as OpenStack) that is communicatively coupled to multiple sleds 400 including a large number of compute sleds 1530 (e.g., each similar to the compute sled 800), memory sleds 1540 (e.g., each similar to the memory sled 1400), accelerator sleds 1550 (e.g., each similar to the memory sled 1000), and storage sleds 1560 (e.g., each similar to the storage sled 1200). One or more of the sleds 1530, 1540, 1550, 1560 may be grouped into a managed node 1570, such as by the orchestrator server 1520, to collectively perform a workload (e.g., an application 1532 executed in a virtual machine or in a container). The managed node 1570 may be embodied as an assembly of physical resources 620, such as processors 820, memory resources 720, accelerator circuits 1020, or data storage 1250, from the same or different sleds 400. Further, the managed node may be established, defined, or "spun up" by the orchestrator server 1520 at the time a workload is to be assigned to the managed node or at any other time, and may exist regardless of whether any workloads are presently assigned to the managed node. In the illustrative embodiment, the orchestrator server 1520 may selectively allocate and/or deallocate physical resources 620 from the sleds 400 and/or add or remove one or more sleds 400 from the managed node 1570 as a function of quality of service (QoS) targets (e.g., performance targets associated with a throughput, latency, instructions per second, etc.) associated with a service level agreement for the workload (e.g., the application 1532). In doing so, the orchestrator server 1520 may receive telemetry data indicative of performance conditions (e.g., throughput, latency, instructions per second, etc.) in each sled 400 of the managed node 1570 and compare the telemetry data to the quality of service targets to determine whether the quality of service targets are being satisfied. The orchestrator server 1520 may additionally determine whether one or more physical resources may be deallocated from the managed node 1570 while still satisfying the QoS targets, thereby freeing up those physical resources for use in another managed node (e.g., to execute a different workload). Alternatively, if the QoS targets are not presently satisfied, the orchestrator server 1520 may determine to dynamically allocate additional physical resources to assist in the execution of the workload (e.g., the application 1532) while the workload is executing. Similarly, the orchestrator server 1520 may determine to dynamically deallocate physical resources from a managed node if the orchestrator server 1520 determines that deallocating the physical resource would result in QoS targets still being met.

Additionally, in some embodiments, the orchestrator server 1520 may identify trends in the resource utilization of the workload (e.g., the application 1532), such as by identifying phases of execution (e.g., time periods in which different operations, each having different resource utilizations characteristics, are performed) of the workload (e.g., the application 1532) and pre-emptively identifying available resources in the data center 100 and allocating them to the managed node 1570 (e.g., within a predefined time period of the associated phase beginning). In some embodiments, the orchestrator server 1520 may model performance based on various latencies and a distribution scheme to place workloads among compute sleds and other resources (e.g., accelerator sleds, memory sleds, storage sleds) in the data center 100. For example, the orchestrator server 1520 may utilize a model that accounts for the performance of resources on the sleds 400 (e.g., FPGA performance, memory access latency, etc.) and the performance (e.g., congestion, latency, bandwidth) of the path through the network to the resource (e.g., FPGA). As such, the orchestrator server 1520 may determine which resource(s) should be used with which workloads based on the total latency associated with each potential resource available in the data center 100 (e.g., the latency associated with the performance of the resource itself in addition to the latency associated with the path through the network between the compute sled executing the workload and the sled 400 on which the resource is located).

In some embodiments, the orchestrator server 1520 may generate a map of heat generation in the data center 100 using telemetry data (e.g., temperatures, fan speeds, etc.) reported from the sleds 400 and allocate resources to managed nodes as a function of the map of heat generation and predicted heat generation associated with different workloads, to maintain a target temperature and heat distribution in the data center 100. Additionally or alternatively, in some embodiments, the orchestrator server 1520 may organize received telemetry data into a hierarchical model that is indicative of a relationship between the managed nodes (e.g., a spatial relationship such as the physical locations of the resources of the managed nodes within the data center 100 and/or a functional relationship, such as groupings of the managed nodes by the customers the managed nodes provide services for, the types of functions typically performed by the managed nodes, managed nodes that typically share or exchange workloads among each other, etc.). Based on differences in the physical locations and resources in the managed nodes, a given workload may exhibit different resource utilizations (e.g., cause a different internal temperature, use a different percentage of processor or memory capacity) across the resources of different managed nodes. The orchestrator server 1520 may determine the differences based on the telemetry data stored in the hierarchical model and factor the differences into a prediction of future resource utilization of a workload if the workload is reassigned from one managed node to another managed node, to accurately balance resource utilization in the data center 100.

To reduce the computational load on the orchestrator server 1520 and the data transfer load on the network, in some embodiments, the orchestrator server 1520 may send self-test information to the sleds 400 to enable each sled 400 to locally (e.g., on the sled 400) determine whether telemetry data generated by the sled 400 satisfies one or more conditions (e.g., an available capacity that satisfies a predefined threshold, a temperature that satisfies a predefined threshold, etc.). Each sled 400 may then report back a simplified result (e.g., yes or no) to the orchestrator server 1520, which the orchestrator server 1520 may utilize in determining the allocation of resources to managed nodes.

Figure 16:
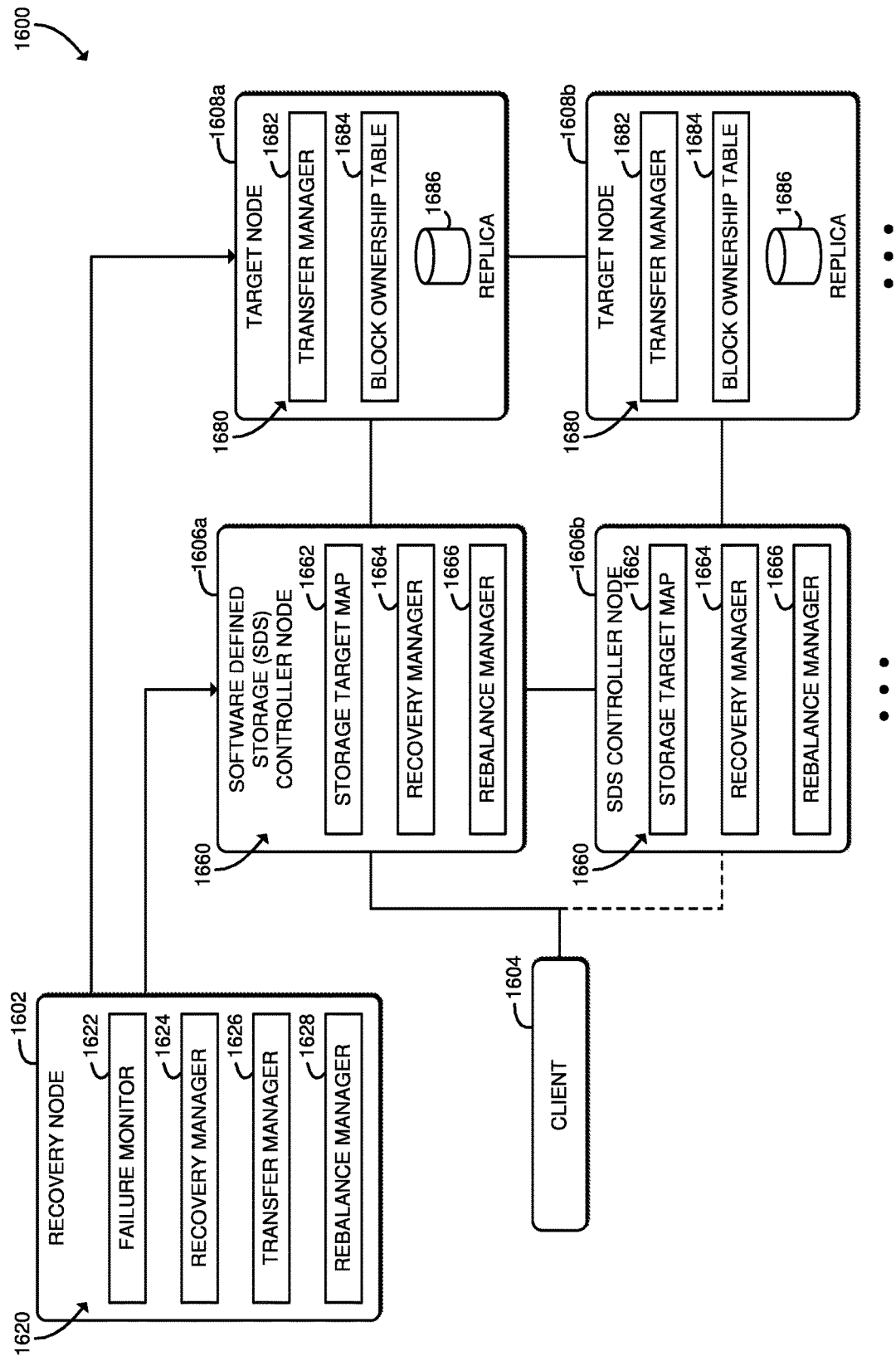
FIG. 16 is a simplified block diagram of at least one embodiment of a system for fast recovery for a distributed storage system.

Referring now to FIG. 16, an illustrative system 1600 for fast recovery for a distributed storage system with disaggregated storage is shown. As shown, the system 1600 includes a recovery node 1602, a client 1604, multiple software defined storage (SDS) controller nodes 1606, and multiple target nodes 1608. In use, the SDS controller nodes 1606 and the target nodes 1608 are included in a distributed storage system. The SDS controller nodes 1606 perform control plane functions and the target nodes 1608 perform data plane functions. The recovery node 1602 monitors for failed nodes. If a SDS controller node 1606 fails, the recovery node 1602 brings up a new SDS controller node 1606 and connects the new SDS controller node 1606 to the corresponding target node 1608. If a target node 1608 fails, the recovery node 1602 brings up a new target node 1608 and connects the new target node 1608 to the corresponding SDS controller node 1606. The new target node 1608 may be populated with replica data copied directly from other target nodes 1608, without being copied through the SDS controller nodes 1606. Thus, the system 1600 may provide fast and seamless recovery of the distributed storage system with little or no impact on client devices and in some cases without any degradation of service (e.g., without reducing the number of replicas of data). Additionally, the system 1600 may improve performance using fast and direct target to target data copies that do not require the involvement of the SDS controllers.

The recovery node 1602 may be embodied as any type of device capable of performing the functions described herein. For example, the recovery node 1602 may be embodied as, without limitation, a sled 400, a compute sled 800, an accelerator sled 1000, a storage sled 1200, a computer, a server, a distributed computing device, a disaggregated computing device, a laptop computer, a tablet computer, a notebook computer, a mobile computing device, a smartphone, a wearable computing device, a multiprocessor system, a server, a workstation, and/or a consumer electronic device. Similarly, each of the SDS controller nodes 1606 and the target nodes 1608 may be embodied as any type of device capable of performing the functions described herein, including, without limitation, a sled 400, a compute sled 800, an accelerator sled 1000, a storage sled 1200, a computer, a server, a distributed computing device, a disaggregated computing device, a laptop computer, a tablet computer, a notebook computer, a mobile computing device, a smartphone, a wearable computing device, a multiprocessor system, a server, a workstation, and/or a consumer electronic device. Illustratively, the recovery node 1602 and each of the SDS controller nodes 1606 may be embodied as a compute sled 800, and each of the target nodes 1608 may be embodied as a storage sled 1200. The target nodes 1608 are coupled to each other and to the SDS controller nodes 1606 by a high-speed storage fabric or other high speed network that supports data storage transfers (e.g., NVMe-oF transfers, RDMA transfers, or other transfers). The client 1604 may be embodied as any computer or other device capable of performing the functions described herein. In some embodiments, the system 1600 may include multiple instances and/or types of clients 1604, such as client devices, client software, gateways (e.g., Ceph RADOS gateways), or other interfaces to the data storage system 1600.

In some embodiments, each of the recovery node 1602, the SDS controller nodes 1606, and/or the target nodes 1608 may be embodied as a virtualized system (e.g., one or more functions executed in virtualized environment(s), such as virtual machine(s) or container(s), in which the underlying hardware resources appear as physical hardware to software executing in the virtualized environment(s), but are separated from the software by an abstraction layer) or a disaggregated system (e.g., composed from one or more underlying hardware devices). In some embodiments, certain functions of the recovery node 1602, the SDS controller nodes 1606, and/or the target nodes 1608 may be duplicated and/or incorporated in other devices. For example, in some embodiments, certain functions of the recovery node 1602 may be performed by the same underlying hardware as the SDS controller nodes 1606 and/or the target nodes 1608.

Still referring to FIG. 16, in an illustrative embodiment, the recovery node 1602 establishes an environment 1620 during operation. The illustrative environment 1620 includes a failure monitor 1622, a recovery manager 1624, a transfer manager 1626, and a rebalance manager 1628. The various components of the environment 1620 may be embodied as hardware, firmware, software, or a combination thereof. As such, in some embodiments, one or more of the components of the environment 1620 may be embodied as circuitry or collection of electrical devices (e.g., failure monitor circuitry 1622, recovery manager circuitry 1624, transfer manager circuitry 1626, and/or rebalance manager circuitry 1628). It should be appreciated that, in such embodiments, one or more of the failure monitor circuitry 1622, the recovery manager circuitry 1624, the transfer manager circuitry 1626, and/or the rebalance manager circuitry 1628 may form a portion of the compute engine, the I/O subsystem, and/or other components of the recovery node 1602. Additionally, in some embodiments, one or more of the illustrative components may form a portion of another component and/or one or more of the illustrative components may be independent of one another.

The failure monitor 1622 is configured to identify a failed node of the distributed storage system 1600 and to identify a corresponding node coupled with the failed node (e.g., the corresponding node may remain coupled with the failed node, although the failed node is no longer accessible by the corresponding node because of the failure). As described above, the distributed storage system 1600 includes multiple controller nodes 1606 and multiple target nodes 1608. Each controller node is coupled with a corresponding target node 1608 via a storage fabric. Each target node 1608 includes replica data 1686. The failed node may be a controller node 1606 or a target node 1608, and thus the corresponding node may be a target node 1608 or a controller node 1606, respectively.

The recovery manager 1624 is configured to instantiate a replacement node, add the replacement node to the distributed storage system 1600, and then couple the replacement node to the corresponding node. If the failed node is a controller node 1606, a replacement controller node 1606 may be coupled to the corresponding target node 1608 by updating a storage target map 1662 of the replacement controller node 1606 with an identifier of the corresponding target node 1608. Instantiating the replacement controller node 1606 may include allocating computing resources of the system 1600 or bringing up the replacement controller node 1606 on an existing node of the system 1600. The recovery manager 1624 may be further configured to bootstrap the replacement controller node 1606 with metadata stored by the corresponding target node 1608. If the failed node is a target node 1608, instantiating the replacement target node 1608 may include allocating storage resources of the system 1600. The replacement target node 1608 may be coupled to the corresponding controller node 1606 by configuring the storage target map 1662 of the corresponding controller node 1606 with an identifier of the replacement target node 1608.

When the failed node is a target node 1608, the transfer manager 1626 is configured to identify a backup target node 1608 of the system 1600. The replica data 1686 of the backup target node 1608 matches the replica data 1686 stored by the failed target node 1608. The transfer manager 1626 is further configured to direct the backup target node 1608 to copy the replica data 1686 to the replacement target node 1608 via the storage fabric. Directing the backup target node 1608 to copy the replica data 1686 may include sending a command to the backup target node 1608 that identifies a data object and in response the target node 1608 identifying one or more data blocks associated with the data object and copying the one or more data blocks to the replacement target node 1608 via the storage fabric.

The rebalance manager 1628 is configured to update a storage target map 1662 of the controller nodes 1606 and identify a rebalanced controller node 1606 based on the updated storage target map 1662. The rebalanced controller node 1606 is responsible for a data object that is stored in replica data 1686 by a target node 1608 coupled to a different controller node 1606. The rebalance manager 1628 is further configured to direct the target node 1608 that currently stores the replica data 1686 to copy the data object to the rebalanced target node 1608 via the storage fabric.

Still referring to FIG. 16, in an illustrative embodiment, each SDS controller node 1606 establishes an environment 1660 during operation. The illustrative environment 1660 includes a recovery manager 1664 and a rebalance manager 1666. The various components of the environment 1660 may be embodied as hardware, firmware, software, or a combination thereof. As such, in some embodiments, one or more of the components of the environment 1660 may be embodied as circuitry or collection of electrical devices (e.g., recovery manager circuitry 1664 and/or rebalance manager circuitry 1666). It should be appreciated that, in such embodiments, one or more of the recovery manager circuitry 1664 and/or the rebalance manager circuitry 1666 may form a portion of the compute engine, the I/O subsystem, and/or other components of the SDS controller node 1606. Additionally, in some embodiments, one or more of the illustrative components may form a portion of another component and/or one or more of the illustrative components may be independent of one another.

As shown, each SDS controller node 1606 may include a storage target map 1662. The storage target map 1662 binds each SDS controller node 1606 to the corresponding target node 1608. For example, each entry of the storage target map 1662 may identify a data object (e.g., a file name or other identifier), the responsible SDS controller node 1606, and the corresponding target node 1608 (e.g., a MAC address, network address, or other identifier). As described further below, the corresponding target node 1608 includes replica data 1686 for the requested object. Each SDS controller node 1606 may include storage target map 1662 data for other SDS controller nodes 1606 (e.g., for every SDS controller node 1606 in the system 1600). Thus, each SDS controller node 1606 may be able to identify the particular target node 1608 accessed by the other SDS controller nodes 1606.

The recovery manager 1664 may be configured to instantiate a replacement controller node 1606 and add the replacement controller node 1606 to the system 1600 in response to failure of a controller node 1606. The recovery manager 1664 may be further configured to couple the replacement controller node 1606 to the target node 1608 that corresponds to the failed controller node 1606. The recovery manager 1664 may be further configured to bootstrap the replacement controller node 1606 with metadata stored by the corresponding target node 1608 in response to coupling of the replacement controller node to corresponding first target node.

The rebalance manager 1666 is configured to identify a rebalanced controller node 1606 based on the storage target map 1662. The rebalanced controller node 1606 is responsible for a data object that is currently stored by the target node 1608 associated with the current controller node 1606. The rebalance manager 1666 is further configured to direct the corresponding target node 1608 to copy the data object to the target node 1608 that corresponds to the rebalanced controller node 1606 via the storage fabric.

Still referring to FIG. 16, in an illustrative embodiment, each target node 1608 establishes an environment 1680 during operation. The illustrative environment 1680 includes a transfer manager 1682, which may be embodied as hardware, firmware, software, or a combination thereof. As such, in some embodiments, one or more of the components of the environment 1680 may be embodied as circuitry or collection of electrical devices (e.g., transfer manager circuitry 1682). It should be appreciated that, in such embodiments, the transfer manager circuitry 1682 may form a portion of the compute engine, the I/O subsystem, and/or other components of the target node 1608. Additionally, in some embodiments, one or more of the illustrative components may form a portion of another component and/or one or more of the illustrative components may be independent of one another.

As shown, each target node 1608 includes a block ownership table 1684 and replica data 1686. The block ownership table 1684 maps data objects (e.g., file names or other identifiers) to disk blocks, memory pages, cache lines, or other data blocks that store the data associated with the data object. The replica data 1686 may be embodied as application data, erasure coded data, or other data stored by the distributed storage system 1600. The target node 1608 may use the block ownership table 1684 to access the particular replica data 1686 requested by the corresponding SDS controller node 1606.

The transfer manager 1682 is configured to directly transfer data to another target node 1608 via the storage fabric. The transfer manager 1682 may be configured to receive a command that identifies a data object, identify one or more data blocks associated with the data object (e.g., using the block ownership table 1684), and copy the one or more data blocks to another target node 1608 via the storage fabric.

Figure 17:
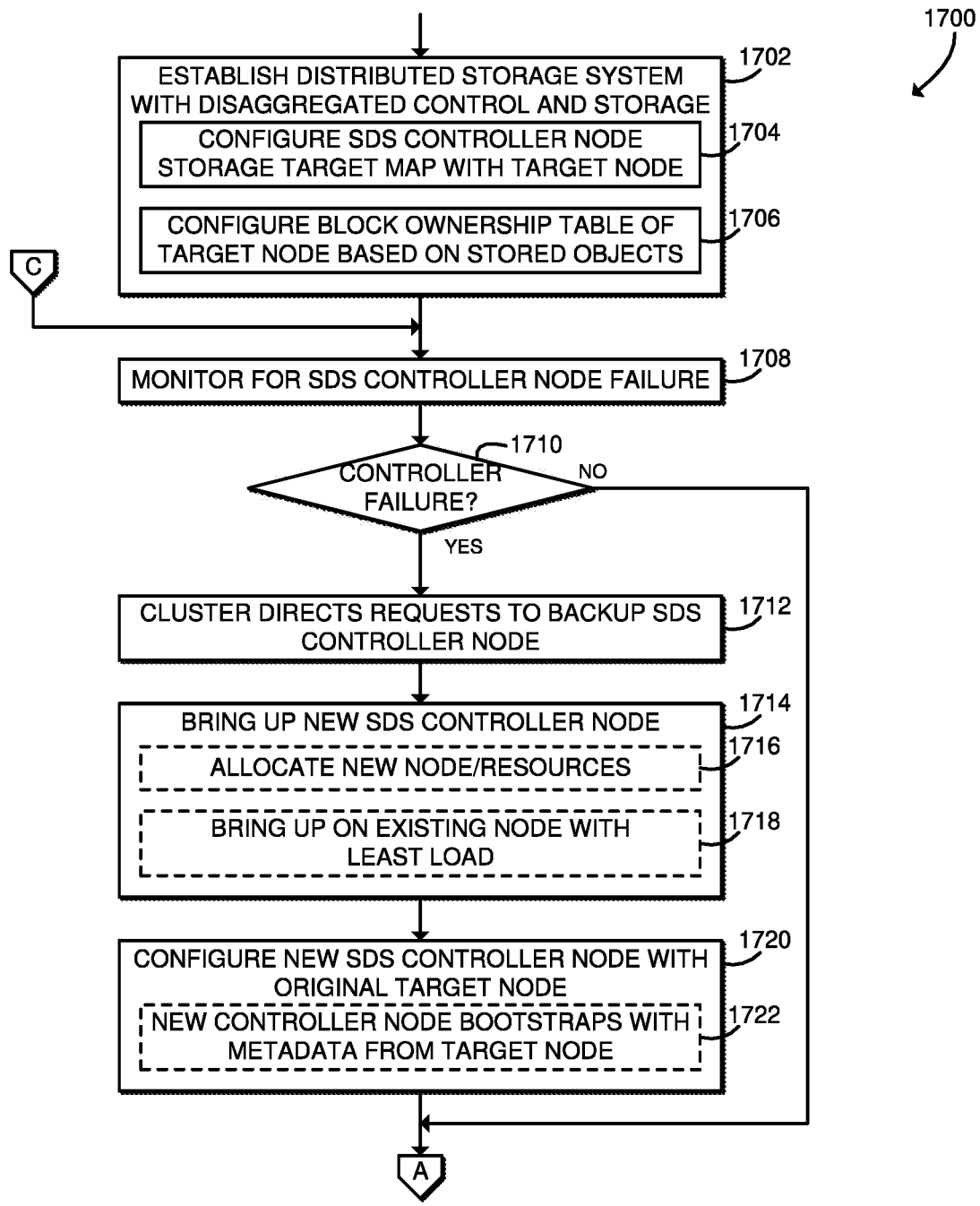
FIGS. 17-19 are a simplified flow diagram of at least one embodiment of a method for fast recovery for a distributed storage system that may be executed by the system of FIG. 16.
Figure 18:
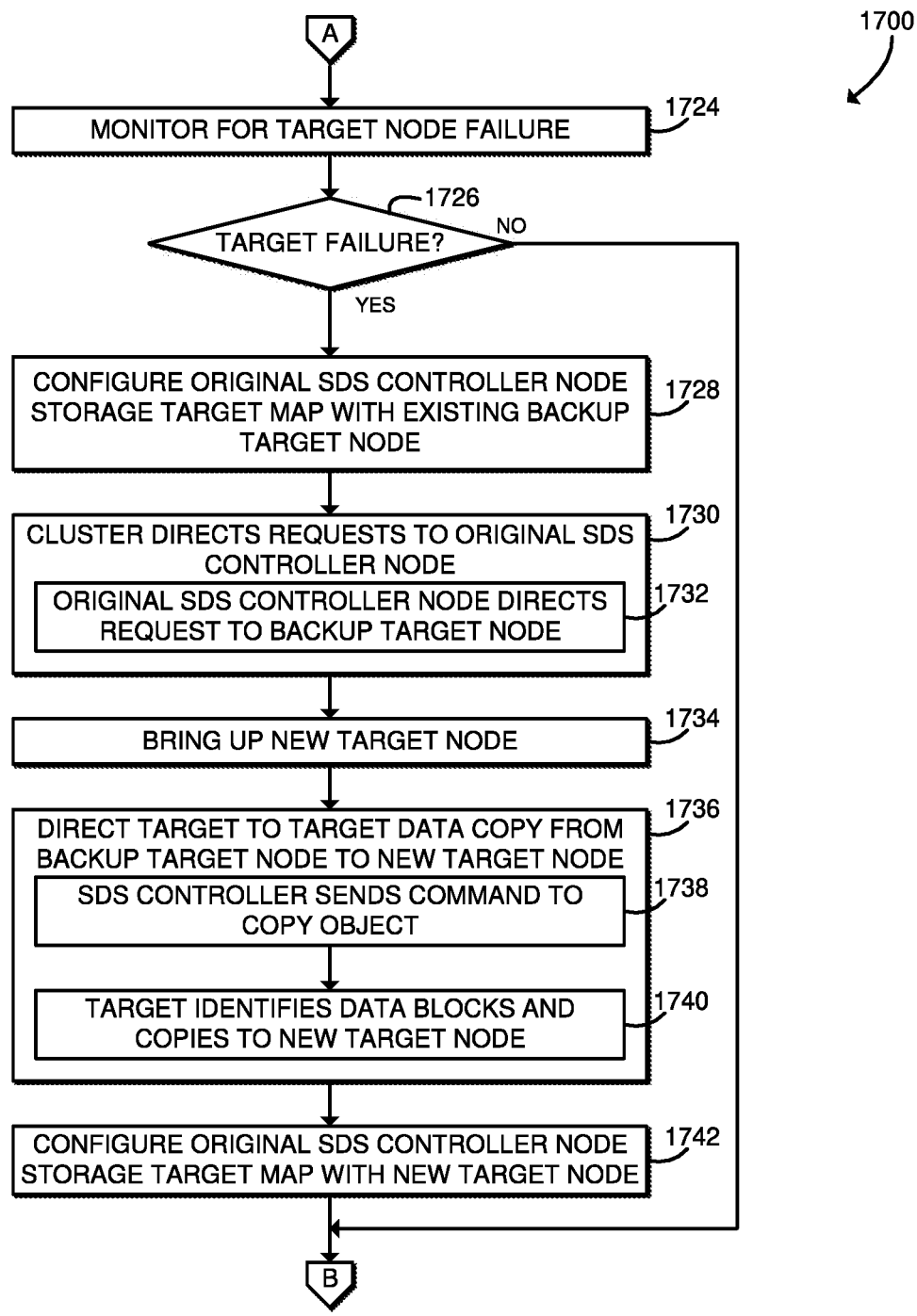
Figure 19:
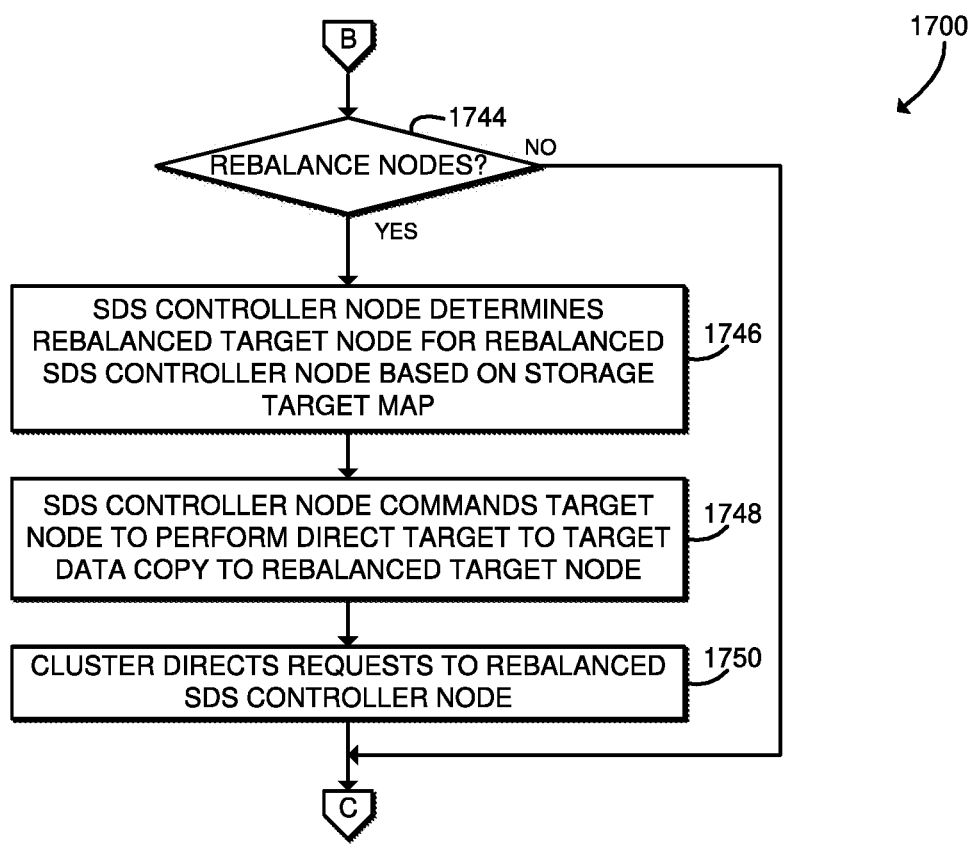

Referring now to FIGS. 17-19, in use, the system 1600 may execute a method 1700 for fast recovery in a distributed storage system. It should be appreciated that, in some embodiments, the operations of the method 1700 may be performed by one or more components of the environment 1620 of the recovery node 1602 as shown in FIG. 16. The method 1700 begins in block 1702, in which the system 1600 establishes a distributed storage system with disaggregated control and storage. In block 1704, the system 1600 configures the storage target map 1662 of multiple SDS controller nodes 1606 to point to corresponding target nodes 1608. Each entry of the storage target map 1662 may identify a particular data object (e.g., a file or other named object), an SDS controller node 1606, and a target node 1608. The target node 1608 stores replica data 1686 for that data object used by the corresponding SDS controller node 1606. The storage target map 1662 may include entries for the entire distributed storage system, which may allow an SDS controller node 1606 to identify the corresponding target node 1608 for other SDS controller nodes 1606. In block 1706, the system 1600 configures the block ownership table 1684 of each target node 1608 based on the stored object. Each entry of the block ownership table 1684 may identify the data object and a range of storage blocks, pages, or other data storage that stores the replica data 1686 for that object. The block ownership table 1684 may be dynamically allocated or otherwise managed by each target node 1608, thus separating data plane services from control plane services provided by the SDS controller nodes 1606.

In block 1708, the recovery node 1602 monitors for SDS controller node 1606 failure. The recovery node 1602 may use any technique to determine whether a SDS controller node 1606 has failed. For example, the recovery node 1602 may periodically or otherwise poll the SDS controller nodes 1606, or the recovery node 1602 may monitor for a heartbeat signal received from the SDS controller nodes 1606. In block 1710, the recovery node 1602 determines whether an SDS controller node 1606 has failed. If not, the method 1700 branches ahead to block 1724, shown in FIG. 18 and described below. If an SDS controller node 1606 has failed, the method 1700 advances to block 1712.

In block 1712, the distributed storage system automatically redirects storage requests from clients 1604 to a backup SDS controller node 1606. Thus, they system 1600 may continue to provide service without interruption even in response to an SDS controller node 1606 failure.

In block 1714, the recovery node 1602 brings up a new SDS controller node 1606 to replace the failed node. The recovery node 1602 may use any appropriate technique to instantiate, spin up, or otherwise activate the new SDS controller node 1606. In some embodiments, in block 1716 the recovery node 1602 may allocate a new compute node or other hardware resources of the system 1600 for the new SDS controller node 1606. For example, the recovery node 1602 may allocate one or more compute sleds 800 or other resources of a data center 100. As another example, the recovery node 1602 may compose a new node from one or more disaggregated resources (e.g., compute, memory, storage, and/or other resources) of the data center 100. In some embodiments, in block 1718 the recovery node 1602 may bring up the new SDS controller node 1606 on an existing node, such as the compute node with the lowest processing load of the system 1600. In that embodiment, the SDS controller node 1606 may be embodied as a virtual machine or other workload that may be executed together with other workloads on a physical node of the data center 100.

In block 1720, the recovery node 1602 configures the new SDS controller node 1606 with the original target node 1608 that was associated with the failed controller node 1606. The recovery node 1602 may, for example, update the storage target map 1662 of the new SDS controller node 1606 to point to the original target node 1608. In some embodiments, in block 1722 the new SDS controller node 1606 may bootstrap using metadata stored by the original target node 1608. Bootstrapping the SDS controller node 1606 may allow the system 1600 to avoid rebalancing objects among the SDS controller nodes 1606, which may improve recovery performance. After configuring the new controller node 1606, the method 1700 advances to block 1724, shown in FIG. 18.

As an illustrative example, and referring back to FIG. 16, the distributed storage system 1600 may be a Ceph cluster. In that example, each SDS controller node 1606 is a Ceph Object Service Daemon (OSD). In the illustrative embodiment, the SDS controller node 1606a may be the primary OSD for an object, and the SDS controller node 1606b may be a backup OSD for that object. As shown, the SDS controller node 1606a is coupled to the target node 1608a, and the SDS controller node 1606b is coupled to the target node 1608b. Thus, when all nodes of the system 1600 are operational, requests from the client 1604 (e.g., a Ceph client, RGW gateway, or other client) for an object are directed to the primary SDS controller node 1606a for that object, which then accesses the target node 1608a over a storage fabric (e.g., NVMe over Fabrics (NVMe-oF) or other high-speed storage connection). The primary SDS controller node 1606a thus services the client request using the replica data 1686 stored by the target node 1608a.

In that illustrative example, if the primary SDS controller node 1606a fails, then requests for the object from the client 1604 are automatically directed to the backup SDS controller node 1606b, which may service the requests without interruption. In that example, the backup SDS controller node 1606b services the requests using the replica data 1686 stored by the target node 1608b. As described above, in response to the failure of the SDS controller node 1606a, a new SDS controller node 1606c is created (not shown). The new SDS controller node 1606c is then configured to access the original target node 1608a. Subsequent client requests may be directed to the new SDS controller node 1606c for servicing. Note that in this example, both of the target nodes 1608a, 1608b remain operational during recovery, allowing for recovery without degrading the service level.

Referring now to FIG. 18, the method 1700 continues in block 1724, in which the recovery node 1602 monitors for target node 1608 failure. The recovery node 1602 may use any technique to determine whether a target node 1608 has failed. For example, the recovery node 1602 may periodically or otherwise poll the target nodes 1608, or the recovery node 1602 may monitor for a heartbeat signal received from the target node 1608. In block 1726, the recovery node 1602 determines whether a target node 1608 has failed. If not, the method 1700 branches ahead to block 1744, shown in FIG. 19 and described below. If a target node 1608 has failed, the method 1700 advances to block 1728.

In block 1728, the recovery node 1602 configures the storage target map 1662 of the original SDS controller node 1606 that was coupled to the failed target node 1608 to reference a backup target node 1608. For example, the recovery node 1602 may determine a backup SDS controller node 1606 and then reference the storage target map 1662 to identify the target node 1608 that is currently assigned to the backup SDS controller node 1606, and then also assign that target node 1608 to the original SDS controller node 1606. In block 1730, the distributed storage system continues to direct requests to the original SDS controller node 1606. In block 1732, the original SDS controller node 1606 directs the request for servicing to the backup target node 1608, based on the updated storage target map 1662. Thus, by redirecting requests to another backup target node 1608, the system 1600 may continue to provide uninterrupted service during recovery, although with a degraded service level (e.g., fewer copies of the replica data 1686).

In block 1734, the recovery node 1602 brings up a new target node 1608 to replace the failed node. The recovery node 1602 may use any appropriate technique to instantiate, spin up, or otherwise activate the new target node 1608. In some embodiments, the recovery node 1602 may allocate a new storage node or other hardware resources of the system 1600 for the new target node 1608. For example, the recovery node 1602 may allocate one or more storage sleds 1200 or other resources of a data center 100. As another example, the recovery node 1602 may compose a new node from one or more disaggregated resources (e.g., compute, memory, storage, and/or other resources) of the data center 100.

In block 1736, the recovery node 1602 directs the new target node 1608 to perform a direct target-to-target data copy from the backup target node 1608 to the new target node 1608. The direct data copy may include transferring data over a storage fabric between the target nodes 1608 (e.g., NVMe-oF or other high-speed storage connection). The copied data may not need to be forwarded or otherwise processed by the associated SDS controller nodes 1606, which may reduce bandwidth usage, processor usage, or otherwise improve performance. The system 1600 may use any appropriate technique to perform the direct target-to-target transfer. Illustratively, in block 1738 the original SDS controller node 1606 may send a command to copy the object to the backup target node 1608. In block 1740, the backup target node 1608 identifies data blocks or other storage locations of the requested object. For example, the backup target node 1608 may identify all data blocks included in the object using the block ownership table 1684. As described above, the block ownership table 1684 maps data objects (e.g., file names or other identifiers) to disk blocks, memory pages, cache lines, or other data blocks that store the data associated with the data object. The backup target node 1608 then copies those data blocks to the new target node 1608 over the storage fabric. For example, the backup target node 1608 may transfer the data using one or more NVMe-oF messages (e.g., one or more NVMe commands such as read or write encapsulated over a message-based transport), remote direct memory access (RDMA) transactions, or other transfers. The new target node 1608 may allocate data blocks to store the transferred data and update its own block ownership table 1684 accordingly.

After completing the data transfer, in block 1742 the recovery node 1602 configures the storage target map 1662 of the original SDS controller node 1606 that was coupled to the failed target node 1608 to reference the newly created and populated target node 1608. After updating the storage target map 1662, client requests to the original SDS controller node 1606 are directed to the new target node 1608. Thus, after referencing the target node 1608, the system 1600 may fully restore the service level of the system (e.g., providing a number of copies of the replica data 1686 as specified in a service level agreement). After configuring the storage target map 1662, the method 1700 advances to block 1744, shown in FIG. 19.

As an illustrative example, and referring again back to FIG. 16, the distributed storage system 1600 may be a Ceph cluster. In that example, each SDS controller node 1606 is a Ceph Object Service Daemon (OSD). In the illustrative embodiment, the SDS controller node 1606a may be the primary OSD for an object, and the SDS controller node 1606b may be a backup OSD for that object. As shown, the SDS controller node 1606a is coupled to the target node 1608a, and the SDS controller node 1606b is coupled to the target node 1608b. Thus, when all nodes of the system 1600 are operational, requests from the client 1604 (e.g., a Ceph client, RGW gateway, or other client) for an object are directed to the primary SDS controller node 1606a for that object, which then accesses the target node 1608a over a storage fabric (e.g., NVMe-oF or other high-speed storage connection). The primary SDS controller node 1606a thus services the client request using the replica data 1686 stored by the target node 1608a.

In that illustrative example, if the target node 1608a fails, then the storage target map 1662 of the SDS controller node 1606a is updated to reference the target node 1608b. After that update, requests for the object from the client 1604 continue to be directed to the primary SDS controller node 1606a, which services the requests using the target node 1608b. Thus, the system 1600 provides uninterrupted service, but at a degraded service level. As described above, in response to the failure of the target node 1608a, a new target node 1608c is created (not shown). The existing, backup target node 1608b is instructed to copy its replica data 1686 to the new target node 1608c. The copy may be performed directly between the backup target nodes 1608b, 1608c, without involvement of the SDS controller node 1606a, which may improve recovery speed. After the copy is complete, the storage target map 1662 of the SDS controller node 1606a is updated to reference the new target node 1608c. Thus, the system 1600 restores full service level after recovery.

Referring now to FIG. 19, the method 1700 continues in block 1744, in which the system 1600 determines whether to rebalance nodes. The system 1600 may rebalance nodes, for example, when an SDS controller node 1606 has failed but before a replacement SDS controller node 1606 has been added to the system 1600. If the system 1600 determines not to rebalance nodes, the method 1700 loops back to block 1708, shown in FIG. 17, to continue monitoring for node failures. If the system 1600 determines to rebalance nodes, the method 1700 advances to block 1746.

In block 1746, an SDS controller node 1606 determines a rebalanced target node 1608 for a rebalanced SDS controller node 1606 based on the storage target map 1662. For example, the SDS controller node 1606a may originally manage an object stored in the target node 1608a. In that example, the object may be rebalanced to the SDS controller node 1606b. The SDS controller node 1606a may reference the storage target map 1662 to identify that the target node 1608b is associated with the rebalanced SDS controller node 1606b.

In block 1748, the SDS controller node 1606 commands the target node 1608 to perform a direct target to target data copy to the rebalanced target node. For example, continuing the previous example, the SDS controller node 1606a may command the target node 1608a to copy the replica data 1686 data directly to the target node 1608b. As described above, the copy may be performed directly between the backup target nodes 1608b, 1608c, without involvement of the SDS controller nodes 1606a, 1606b, which may improve rebalance speed. Accordingly, the system 1600 may improve recovery performance even if rebalancing is required.

After rebalancing, in block 1750 the distributed storage system 1600 directs requests to the rebalanced SDS controller node 1606. Continuing the previous example, requests are directed to the SDS controller node 1606b, which may service the requests with the replica data 1686 stored by the target node 1608b. After performing rebalancing, the method 1700 loops back to block 1708, shown in FIG. 17, to continue monitoring for node failures.

EXAMPLES

Illustrative examples of the technologies disclosed herein are provided below. An embodiment of the technologies may include any one or more, and any combination of, the examples described below.

Example 1 includes a computing device for distributed storage recovery, the computing device comprising a failure monitor to (i) identify a failed node of a distributed storage system, wherein the distributed storage system comprises a plurality of controller nodes and a plurality of target nodes, wherein each controller node is coupled with a corresponding target node via a storage fabric, and wherein each target node comprises replica data, and (ii) identify a corresponding node coupled with the failed node; and a recovery manager to (i) instantiate a replacement node, (ii) add the replacement node to the distributed storage system in response to identification of the failed node, and (iii) couple the replacement node to the corresponding node in response to addition of the replacement node to the distributed storage system.

Example 2 includes the subject matter of Example 1, and wherein the storage fabric comprises a nonvolatile memory over fabric storage interface.

Example 3 includes the subject matter of any of Examples 1 and 2, and wherein the failed node comprises a failed controller node, the corresponding node comprises a corresponding target node, and the replacement node comprises a replacement controller node.

Example 4 includes the subject matter of any of Examples 1-3, and wherein to couple the replacement controller node to the corresponding target node comprises to configure a storage target map of the replacement controller node with an identifier of the corresponding target node.

Example 5 includes the subject matter of any of Examples 1-4, and wherein to instantiate the replacement controller node comprises to allocate computing resources of the distributed storage system for the replacement controller node.

Example 6 includes the subject matter of any of Examples 1-5, and wherein to instantiate the replacement controller node comprises to bring up the replacement controller node on an existing node of the distributed storage system.

Example 7 includes the subject matter of any of Examples 1-6, and wherein to instantiate the replacement controller node further comprises to select a least-loaded node of the distributed storage system as the existing node.

Example 8 includes the subject matter of any of Examples 1-7, and wherein the recovery manager is further to bootstrap the replacement controller node with metadata stored by the corresponding target node in response to coupling of the replacement controller node to corresponding first target node.

Example 9 includes the subject matter of any of Examples 1-8, and wherein the failed node comprises a failed target node, the corresponding node comprises a corresponding controller node, and the replacement node comprises a replacement target node.

Example 10 includes the subject matter of any of Examples 1-9, and wherein to instantiate the replacement target node comprises to allocate storage resources of the distributed storage system for the replacement target node.

Example 11 includes the subject matter of any of Examples 1-10, and further including a transfer manager to identify a backup target node of the distributed storage system, wherein the replica data of the backup target node matches the replica data stored by the failed target node; and direct the backup target node to copy the replica data to the replacement target node via the storage fabric; wherein to couple the replacement node to the corresponding node comprises to couple the replacement target node to the corresponding controller node in response to direction of the backup target node to copy the replica data.

Example 12 includes the subject matter of any of Examples 1-11, and wherein to couple the replacement target node to the corresponding controller node comprises to configure a storage target map of the corresponding controller node with an identifier of the replacement target node.

Example 13 includes the subject matter of any of Examples 1-12, and wherein to direct the backup target node to copy the replica data comprises to send a command to the backup target node, wherein the command identifies a data object; identify, by the backup target node, one or more data blocks associated with the data object; and copy, by the backup target node, the one or more data blocks to the replacement target node via the storage fabric.

Example 14 includes the subject matter of any of Examples 1-13, and further including a rebalance manager to update a storage target map of a first controller node of the distributed storage system, wherein the first controller node is coupled to a first target node; identify a second controller node based on the storage target map in response to an update of the storage target map, wherein the second controller node is coupled to a second target node, and wherein the second controller node is associated with a data object stored by the first target node; and direct the first target node to copy the data object to the second target node via the storage fabric.

Example 15 includes the subject matter of any of Examples 1-14, and wherein each of the controller nodes comprises a compute sled of a data center; and each of the target nodes comprises a storage sled of the data center.

Example 16 includes a method for distributed storage recovery, the method comprising identifying, by a computing device, a failed node of a distributed storage system, wherein the distributed storage system comprises a plurality of controller nodes and a plurality of target nodes, wherein each controller node is coupled with a corresponding target node via a storage fabric, and wherein each target node comprises replica data; identifying, by the computing device, a corresponding node coupled with the failed node; instantiating, by the computing device, a replacement node; adding, by the computing device, the replacement node to the distributed storage system in response to identifying the failed node; and coupling, by the computing device, the replacement node to the corresponding node in response to adding the replacement node to the distributed storage system.

Example 17 includes the subject matter of Example 16, and wherein the storage fabric comprises a nonvolatile memory over fabric storage interface.

Example 18 includes the subject matter of any of Examples 16 and 17, and wherein the failed node comprises a failed controller node, the corresponding node comprises a corresponding target node, and the replacement node comprises a replacement controller node.

Example 19 includes the subject matter of any of Examples 16-18, and wherein coupling the replacement controller node to the corresponding target node comprises configuring a storage target map of the replacement controller node with an identifier of the corresponding target node.

Example 20 includes the subject matter of any of Examples 16-19, and wherein instantiating the replacement controller node comprises allocating computing resources of the distributed storage system for the replacement controller node.

Example 21 includes the subject matter of any of Examples 16-20, and wherein instantiating the replacement controller node comprises bringing up the replacement controller node on an existing node of the distributed storage system.

Example 22 includes the subject matter of any of Examples 16-21, and wherein instantiating the replacement controller node further comprises selecting a least-loaded node of the distributed storage system as the existing node.

Example 23 includes the subject matter of any of Examples 16-22, and further including bootstrapping, by the computing device, the replacement controller node with metadata stored by the corresponding target node in response to coupling the replacement controller node to corresponding first target node.

Example 24 includes the subject matter of any of Examples 16-23, and wherein the failed node comprises a failed target node, the corresponding node comprises a corresponding controller node, and the replacement node comprises a replacement target node.

Example 25 includes the subject matter of any of Examples 16-24, and wherein instantiating the replacement target node comprises allocating storage resources of the distributed storage system for the replacement target node.

Example 26 includes the subject matter of any of Examples 16-25, and further including identifying, by the computing device, a backup target node of the distributed storage system, wherein the replica data of the backup target node matches the replica data stored by the failed target node; and directing, by the computing device, the backup target node to copy the replica data to the replacement target node via the storage fabric; wherein coupling the replacement node to the corresponding node comprises coupling the replacement target node to the corresponding controller node in response to directing the backup target node to copy the replica data.

Example 27 includes the subject matter of any of Examples 16-26, and wherein coupling the replacement target node to the corresponding controller node comprises configuring a storage target map of the corresponding controller node with an identifier of the replacement target node.

Example 28 includes the subject matter of any of Examples 16-27, and wherein directing the backup target node to copy the replica data comprises sending a command to the backup target node, wherein the command identifies a data object; identifying, by the backup target node, one or more data blocks associated with the data object; and copying, by the backup target node, the one or more data blocks to the replacement target node via the storage fabric.

Example 29 includes the subject matter of any of Examples 16-28, and further including updating, by the computing device, a storage target map of a first controller node of the distributed storage system, wherein the first controller node is coupled to a first target node; identifying, by the first controller node, a second controller node based on the storage target map in response to updating the storage target map, wherein the second controller node is coupled to a second target node, and wherein the second controller node is associated with a data object stored by the first target node; and directing, by the first controller node, the first target node to copy the data object to the second target node via the storage fabric.

Example 30 includes the subject matter of any of Examples 16-29, and wherein each of the controller nodes comprises a compute sled of a data center; and each of the target nodes comprises a storage sled of the data center.

Example 31 includes a computing device comprising a processor; and a memory having stored therein a plurality of instructions that when executed by the processor cause the computing device to perform the method of any of Examples 16-30.

Example 32 includes one or more non-transitory, computer readable storage media comprising a plurality of instructions stored thereon that in response to being executed result in a computing device performing the method of any of Examples 16-30.

Example 33 includes a computing device comprising means for performing the method of any of Examples 16-30.

The invention claimed is:

1. A computing device for distributed storage recovery, the computing device comprising:
a failure monitor to (i) identify a failed controller node of a distributed storage system, wherein the distributed storage system comprises a plurality of controller nodes and a plurality of target nodes, wherein each controller node is coupled with a corresponding target node via a storage fabric, and wherein each target node comprises replica data, and (ii) identify the corresponding target node coupled with the failed controller node; and
a recovery manager to (i) instantiate a replacement controller node, (ii) add the replacement controller node to the distributed storage system in response to identification of the failed controller node, and (iii) couple the replacement controller node to the corresponding target node in response to addition of the replacement controller node to the distributed storage system, wherein to couple the replacement controller node to the corresponding target node includes to configure a storage target map of the replacement controller node with an identifier of the corresponding target node.

2. The computing device of claim 1, wherein the storage fabric comprises a nonvolatile memory over fabric storage interface.

3. The computing device of claim 1, wherein to instantiate the replacement controller node includes to allocate computing resources of the distributed storage system for the replacement controller node.

4. The computing device of claim 1, wherein to instantiate the replacement controller node includes to bring up the replacement controller node on an existing node of the distributed storage system.

5. The computing device of claim 4, wherein to instantiate the replacement controller node further includes to select a least-loaded node of the distributed storage system as the existing node.

6. The computing device of claim 1, wherein the recovery manager is further to bootstrap the replacement controller node with metadata stored by the corresponding target node in response to coupling of the replacement controller node to corresponding first target node.

7. The computing device of claim 1, further comprising a rebalance manager to:
update a storage target map of a first controller node of the distributed storage system, wherein the first controller node is coupled to a first target node;

identify a second controller node based on the storage target map in response to an update of the storage target map, wherein the second controller node is coupled to a second target node, and wherein the second controller node is associated with a data object stored by the first target node; and direct the first target node to copy the data object to the second target node via the storage fabric.

8. The computing device of claim 1, wherein:
each of the controller nodes comprises a compute sled of a data center; and
each of the target nodes comprises a storage sled of the data center.

9. One or more non-transitory computer-readable storage media comprising a plurality of instructions stored thereon that, in response to being executed, cause a computing device to:
identify a failed target node of a distributed storage system, wherein the distributed storage system comprises a plurality of controller nodes and a plurality of target nodes, wherein each controller node is coupled with a corresponding target node via a storage fabric, and wherein each target node comprises replica data;
identify a corresponding controller node coupled with the failed target node;
instantiate a replacement target node;
add the replacement target node to the distributed storage system in response to identifying the faded target node;
couple the replacement target node to the corresponding controller node in response to adding the replacement target node to the distributed storage system;
identify a backup target node of the distributed storage system, wherein the replica data of the backup target node matches the replica data stored by the failed target node; and
direct the backup target node to copy the replica data to the replacement target node via the storage fabric;
wherein to couple the replacement target node to the corresponding controller node comprises to couple the replacement target node to the corresponding controller node in response to directing the backup target node to copy the replica data.

10. The one or more non-transitory computer-readable storage media of claim 9, wherein to direct the backup target node to copy the replica data comprises to:
send a command to the backup target node, wherein the command identifies a data object;
identify, by the backup target node, one or more data blocks associated with the data object; and
copy, by the backup target node, the one or more data blocks to the replacement target node via the storage fabric.

11. A computing device for distributed storage recovery, the computing device comprising:
a failure monitor to (i) identify a failed target node of a distributed storage system, wherein the distributed storage system comprises a plurality of controller nodes and a plurality of target nodes, wherein each controller node is coupled with a corresponding target node via a storage fabric, and wherein each target node comprises replica data, and (ii) identify a corresponding controller node coupled with the failed target node; and
a recovery manager to (i) instantiate a replacement target node, (ii) add the replacement target node to the distributed storage system in response to identification of the failed target node, and (iii) couple the replacement target node to the corresponding controller node in response to addition of the replacement target node to the distributed storage system, wherein to couple the replacement target node to the corresponding controller node includes to configure a storage target map of the corresponding controller node with an identifier of the replacement target node.

12. The computing device of claim 11, wherein to instantiate the replacement target node comprises to allocate storage resources of the distributed storage system for the replacement target node.

13. The computing device of claim 11, further comprising a transfer manager to:
identify a backup target node of the distributed storage system, wherein the replica data of the backup target node matches the replica data stored by the failed target node; and
direct the backup target node to copy the replica data to the replacement target node via the storage fabric;
wherein to couple the replacement target node to the corresponding controller node comprises to couple the replacement target node to the corresponding controller node in response to direction of the backup target node to copy the replica data.

14. The computing device of claim 13, wherein to direct the backup target node to copy the replica data comprises to:
send a command to the backup target node, wherein the command identifies a data object;
identify, by the backup target node, one or more data blocks associated with the data object; and
copy, by the backup target node, the one or more data blocks to the replacement target node via the storage fabric.

15. A computing device for distributed storage recovery, the computing device comprising:
a failure monitor to (i) identify a failed node of a distributed storage system, wherein the distributed storage system comprises a plurality of controller nodes and a plurality of target nodes, wherein each controller node is coupled with a corresponding target node via a storage fabric, and wherein each target node comprises replica data, and (ii) identify a corresponding node coupled with the failed node;
a recovery manager to (i) instantiate a replacement node, (ii) add the replacement node to the distributed storage system in response to identification of the failed node, and (iii) couple the replacement node to the corresponding node in response to addition of the replacement node to the distributed storage system; and
a rebalance manager to:
update a storage target map of a first controller node of the distributed storage system, wherein the first controller node is coupled to a first target node,
identify a second controller node based on the storage target map in response to an update of the storage target map, wherein the second controller node is coupled to a second target node, and wherein the second controller node is associated with a data object stored by the first target node, and
direct the first target node to copy the data object to the second target node via the storage fabric.

16. The computing device of claim 15, wherein the storage fabric comprises a nonvolatile memory over fabric storage interface.

17. The computing device of claim 15, wherein:
each of the controller nodes comprises a compute sled of a data center; and each of the target nodes comprises a storage sled of the data center.

18. A computing device for distributed storage recovery, the computing device comprising:
a failure monitor to (i) identify a failed controller node of a distributed storage system, wherein the distributed storage system comprises a plurality of controller nodes and a plurality of target nodes, wherein each controller node is coupled with a corresponding target node via a storage fabric, and wherein each target node comprises replica data, and (ii) identify a corresponding target node coupled with the failed controller node; and
a recovery manager to (i) instantiate a replacement controller node, wherein to instantiate the replacement controller node includes to bring up the replacement controller node on an existing node of the distributed storage system, and to select a least-loaded node of the distributed storage system as the existing node (ii) add the replacement controller node to the distributed storage system in response to identification of the failed controller node, and (iii) couple the replacement controller node to the corresponding target node in response to addition of the replacement controller node to the distributed storage system.

19. The computing device of claim 18, wherein the storage fabric comprises a nonvolatile memory over fabric storage interface.

20. The computing device of claim 18, wherein to couple the replacement controller node to the corresponding target node comprises to configure a storage target map of the replacement controller node with an identifier of the corresponding target node.

21. The computing device of claim 18, wherein to instantiate the replacement controller node comprises to allocate computing resources of the distributed storage system for the replacement controller node.

22. A computing device for distributed storage recovery, the computing device comprising:
a failure monitor to (i) identify a failed controller node of a distributed storage system, wherein the distributed storage system comprises a plurality of controller nodes and a plurality of target nodes, wherein each controller node is coupled with a corresponding target node via a storage fabric, and wherein each target node comprises replica data, and (ii) identify a corresponding target node coupled with the failed controller node; and
a recovery manager to (i) instantiate a replacement controller node, (ii) add the replacement controller node to the distributed storage system in response to identification of the failed controller node, (iii) couple the replacement controller node to the corresponding target node in response to addition of the replacement controller node to the distributed storage system, and (iv) bootstrap the replacement controller node with metadata stored by the corresponding target node in response to coupling of the replacement controller node to corresponding first target node.

23. The computing device of claim 3, wherein the storage fabric comprises a nonvolatile memory over fabric storage interface.

24. The computing device of claim 22, wherein to couple the replacement controller node to the corresponding target node comprises to configure a storage target map of the replacement controller node with an identifier of the corresponding target node.

25. The computing device of claim 22, wherein to instantiate the replacement controller node comprises to allocate computing resources of the distributed storage system for the replacement controller node.

* * * * *